US010250407B2

(12) United States Patent
Ishizaki

(10) Patent No.: US 10,250,407 B2
(45) Date of Patent: Apr. 2, 2019

(54) COMMUNICATION SYSTEM USING RING NETWORK

(71) Applicant: HONDA MOTOR CO., LTD., Tokyo (JP)

(72) Inventor: Ryusuke Ishizaki, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 138 days.

(21) Appl. No.: 15/460,288

(22) Filed: Mar. 16, 2017

(65) Prior Publication Data
US 2017/0272272 A1 Sep. 21, 2017

(30) Foreign Application Priority Data
Mar. 18, 2016 (JP) .................. 2016-056253

(51) Int. Cl.
H04L 12/42 (2006.01)
H04L 12/801 (2013.01)
(Continued)

(52) U.S. Cl.
CPC ............. *H04L 12/42* (2013.01); *H04L 47/13* (2013.01); *H04L 47/2466* (2013.01);
(Continued)

(58) Field of Classification Search
CPC ..... H04L 12/42; H04L 47/13; H04L 47/2466; H04L 47/35; H04L 49/351; H04L 69/22
(Continued)

(56) References Cited

U.S. PATENT DOCUMENTS 6,512,777 B1 * 1/2003 Nakatsugawa ......... H04L 12/43
370/236
2002/0087716 A1 * 7/2002 Mustafa .................. H04L 29/06
709/236
(Continued)

FOREIGN PATENT DOCUMENTS

JP S62114356 A 5/1987
JP S63226151 A 9/1988
(Continued)

OTHER PUBLICATIONS

Notice of Reasons of Rejection for Japanese Application No. 2016-056253, dated Oct. 24, 2017, 7 pages.
(Continued)

Primary Examiner — Obaidul Huq
(74) Attorney, Agent, or Firm — Armstrong Teasdale LLP

(57) ABSTRACT

In a communication system having multiple nodes communicably connected via a ring network, at least two of the nodes each includes: a packet distributor that receives an ordinary packet and an interrupt packet from another node and distributes the received packets; and an output switching unit that outputs the ordinary packet and the interrupt packet that are not addressed to the own node such that the interrupt packet is output more preferentially than the ordinary packet. When the output switching unit receives the interrupt packet while outputting the ordinary packet, the output switching unit outputs the interrupt packet by embedding it into the ordinary packet that is being output at a position between the header and trailer of the ordinary packet. When the ordinary packet transmitted from the other node contains an interrupt packet embedded therein, the packet distributor extracts the interrupt packet and distributes the extracted interrupt packet.

5 Claims, 21 Drawing Sheets

(51) Int. Cl.
*H04L 29/06* (2006.01)
*H04L 12/931* (2013.01)
*H04L 12/855* (2013.01)

(52) U.S. Cl.
CPC ............ *H04L 47/35* (2013.01); *H04L 49/351* (2013.01); *H04L 69/22* (2013.01)

(58) Field of Classification Search
USPC ........................................ 370/351, 389, 392
See application file for complete search history.

(56) References Cited

U.S. PATENT DOCUMENTS

2003/0133448 A1\* 7/2003 Frink ............... H04N 21/43615
370/389
2010/0208581 A1\* 8/2010 Nagano ................... H04L 69/40
370/217

FOREIGN PATENT DOCUMENTS

| JP | 2000134213 A | 5/2000 |
| JP | 2001326663 A | 11/2001 |
| JP | 2002171268 A | 6/2002 |

OTHER PUBLICATIONS

Tsiang, D. et al., The Cisco SRP MAC Layer Protocol, Network Working Group—Cisco Systems, RFC 2892, Aug. 2000, 52 pages.

\* cited by examiner

COMMUNICATION SYSTEM USING RING NETWORK

TECHNICAL FIELD

The present invention relates to a communication system including a plurality of nodes communicably connected to each other via a ring network.

BACKGROUND ART

Networks connecting a plurality of terminals (nodes) such as computers may have various topologies such as bus, star, ring and mesh topologies. An example of a bus network is Ethernet (registered trademark). Ethernet has a physical star topology but has a logical bus topology, in which each node can freely transmit a signal (data). On the other hand, a signal collision may occur in Ethernet, and in such a case, delivery of the signal is delayed (namely, latency is increased).

Like Ethernet, ring networks often are wired in a physical star topology in which each network node is connected to a central hub. An example of a ring network is Token Ring. In Token Ring, a signal called a "token" travels around a logical ring (token passing), and only a node where the token is present can send data. Namely, the nodes where the token is not present cannot send data, and therefore, collision of data on the network is prevented. The data sent out to the ring is transmitted to the destination node by being relayed by nodes other than the destination node.

With regard to a communication system having a plurality of nodes connected to each other via Token Ring, it has been proposed to provide, as a flow control system to cope with a load variation at a receiver node without complicating the functions of the nodes, a system in which a sender node includes a send-out means that sends out a set of data addressed to a receiver node and a busy token and a relay means that, upon receipt of the set of data and token sent out by the sender node itself, sends out the set as it is, and a receiver node includes a relay means that, if there is no room to accept data when receiving the set of data and token, sends out the set as it is and an acceptance means that, if there is room to accept data when receiving the set of data and token, accepts the data included in the set (JP2001-326663A).

Further, a communication device is known which, when transmitting data via a bus or ring network, divides the data into segments each having a predetermined size, adds a header at the beginning of each data segment and a trailer and a CRC (Cyclic Redundancy Check) at the end of each data segment to form a data packet, and sets priority to each data packet, such that the data packets are sent out to the network in order from the one with the highest priority (see, for example, JP2000-134213A or JP2002-171268A).

However, in the system proposed in JP2001-326663A, when the sender node sends data including embedded control content for controlling hardware of the receiver node, if the receiver node is continuously in a state with no room to accept data, the relay means keeps sending out the data, and thus, the receiver node cannot accept the data.

In a case where the technology described in JP2000-134213A or JP2002-171268A is used in the ring network, because the data to be transmitted is divided to form data packets, it is possible to make a data packet with a high priority pass a data packet with a low priority (put the data packet with a high priority before the data packet with a low priority) such that the data packet with a high priority is transmitted earlier. However, when the transmission of the data packet with a low priority has been started already, it is necessary to wait for the completion of the transmission of the data packet with a low priority before starting the transmission of the data with a high priority. In order to have the data packet with a high priority sent more promptly, it may be conceived to divide the data to be transmitted into smaller data segments such that each data packet has a smaller size. However, when the transmission data is divided into smaller data segments to generate data packets having a smaller size, the number of the data packets increases, and accordingly, the amount of data of the header, trailer, etc. of the data packets increases. This deteriorates the transmission efficiency of the transmission data, and in addition, increases the processing load for sorting and processing the incoming data packets at each node.

BRIEF SUMMARY OF THE INVENTION

In view of such a prior art problem, a primary object of the present invention is to provide a communication system using a ring network, which can allow data with a high priority to be communicated between nodes promptly without deteriorating the transmission efficiency of the transmission data.

To achieve such an object, according to an aspect of the present invention, there is provided a communication system (1) having a plurality of nodes (2) communicably connected via a ring network (3), wherein each of at least two of the nodes comprises: a software-operated data generator (8) that executes arithmetic processing using software to generate ordinary transmission data (Dtn) and interrupt transmission data (Dti) to be transmitted to another node; an ordinary packet send-out block (18) that generates and sends out an ordinary transmission packet (Ptn) containing the ordinary transmission data generated by the software-operated data generator and having a header and a trailer; an interrupt packet send-out block (20) that generates and sends out an interrupt transmission packet (Pti) containing the interrupt transmission data generated by the software-operated data generator and having a header and a trailer; a packet distributor (11) that receives an ordinary packet and an interrupt packet transmitted from another node as an ordinary input packet (Pen) and an interrupt input packet (Pei), respectively, and distributes the received ordinary input packet and interrupt input packet, the ordinary packet containing ordinary data and having a header and a trailer and the interrupt packet containing interrupt data and having a header and a trailer; an ordinary packet relay block (17) that sends out the ordinary input packet distributed from the packet distributor when a destination of the ordinary input packet is not the own node, to relay the ordinary input packet; an interrupt packet relay block (19) that sends out the interrupt input packet distributed from the packet distributor when a destination of the interrupt input packet is not the own node, to relay the interrupt input packet; and an output switching unit (23) that receives the interrupt transmission packet, the interrupt input packet, the ordinary transmission packet, and the ordinary input packet, and outputs the received interrupt transmission packet, interrupt input packet, ordinary transmission packet, and ordinary input packet as output packets (Po) in such a manner that the interrupt transmission packet and the interrupt input packet are output more preferentially than the ordinary transmission packet and the ordinary input packet, wherein when the output switching unit (23) receives an interrupt packet (Pi), which is the interrupt transmission packet (Pti) or the interrupt input packet (Pei), while the output switching unit (23) is outputting an ordinary packet (Pn), which is the ordinary transmission packet (Ptn) or the ordinary input packet (Pen), the output switching unit (23) outputs the received interrupt packet by embedding the received interrupt packet into the ordinary packet that is being output at a position between the header and the trailer of the ordinary packet, and wherein when the ordinary input packet transmitted from the other node contains an interrupt packet embedded therein, the packet distributor (11) extracts the interrupt packet and distributes the extracted interrupt packet as an interrupt input packet.

According to this system, because the output switching unit outputs the interrupt packet by embedding it in the ordinary packet that is being output at a position between the header and the trailer of the ordinary packet, the interrupt packet can be output right away even when the ordinary packet has a large data size and it takes time to output the same. Further, because the packet distributor extracts and distributes the embedded interrupt packet, the interrupt packet embedded in the ordinary packet can be processed properly. Thus, data with a high priority (namely, interrupt packets) can be communicated between the nodes promptly. Also, because the system does not require reduction of the size of the ordinary packets (or ordinary data contained in the ordinary packets), deterioration of the transmission efficiency caused by the reduction of the size of the packets can be avoided.

In the above system, configuration may be made such that when the output switching unit (23) receives the interrupt transmission packet (Pti) sent out from the interrupt packet send-out block (20) while the output switching unit (23) is outputting the ordinary input packet (Pen) received from the ordinary packet relay unit (17), the output switching unit (23) outputs the received interrupt transmission packet (Pti) by embedding the same into the ordinary input packet (Pen) that is being output at a position between the header and the trailer of the ordinary input packet.

According to this configuration, even when the ordinary input packet has a large data size and it takes time to output the same, the interrupt transmission packet can be output right away with a reduced latency, namely, without waiting for the completion of the output of the ordinary input packet.

Also, in the above system, configuration may be made such that when the output switching unit (23) receives the interrupt input packet (Pei) from the interrupt packet relay unit (19) while the output switching unit (23) is outputting the ordinary transmission packet (Ptn) received from the ordinary packet send-out block (18), the output switching unit (23) outputs the received interrupt input packet (Pei) by embedding the same into the ordinary transmission packet (Ptn) that is being output at a position between the header and the trailer of the ordinary transmission packet.

According to this configuration, even when the ordinary transmission packet has a large data size and it takes time to output the same, the interrupt input packet can be output right away with a reduced latency, namely, without waiting for the completion of the output of the ordinary transmission packet.

Also, in the above system, configuration may be made such that when the output switching unit (23) receives the interrupt input packet (Pei) from the interrupt packet relay block (19) while the output switching unit (23) is outputting the ordinary input packet (Pen) received from the ordinary packet relay block (17), the output switching unit (23) outputs the received interrupt input packet (Pei) by embedding the same into the ordinary input packet (Pen) that is being output at a position between the header and the trailer of the ordinary input packet.

According to this configuration, even when the ordinary input packet has a large data size and it takes time to output the same, the interrupt input packet can be output right away with a reduced latency, namely, without waiting for the completion of the output of the ordinary input packet.

Also, in the above system, configuration may be made such that when the output switching unit (23) receives the interrupt transmission packet (Pti) from the interrupt packet send-out block (20) while the output switching unit (23) is outputting the ordinary transmission packet (Ptn) received from the ordinary packet send-out block (18), the output switching unit (23) outputs the received interrupt transmission packet (Pti) by embedding the same into the ordinary transmission packet (Ptn) that is being output at a position between the header and the trailer of the ordinary transmission packet.

According to this configuration, even when the ordinary transmission packet has a large data size and it takes time to output the same, the interrupt transmission packet can be output right away with a reduced latency, namely, without waiting for the completion of the output of the ordinary transmission packet.

Also, in the above system, configuration may be made such that each of the at least two of the nodes further comprises: an ordinary packet accepting block (21) that accepts the ordinary input packet (Pen) distributed from the packet distributor (11) when the destination of the ordinary input packet is the own node; a software-operated controller (9) that executes arithmetic processing using software based on the ordinary data contained in the ordinary input packet accepted by the ordinary packet accepting block (21) to control hardware (7) serving as a control target; and an interrupt packet accepting block (22) that accepts the interrupt input packet (Pei) distributed from the packet distributor (11) when the destination of the interrupt input packet is the own node and, based on the interrupt data contained in the accepted interrupt input packet, outputs a hardware control signal (Sc) to the hardware (7) serving as the control target or other hardware (100) associated with the own node such that the hardware serving as the control target or the other hardware is directly controlled based on the hardware control signal without via the software-operated controller.

According to this configuration, while the software-operated controller of each node controls the hardware serving as the control target by executing arithmetic processing using software based on the ordinary data (ordinary input data) contained in the ordinary packet accepted by the ordinary packet accepting block, when necessary, one node can control the hardware of the other node promptly without via the software-operated controller of the other node by transmitting the interrupt packet to the other node.

Thus, according to an aspect of the present invention, a communication system using a ring network, which can allow data with a high priority to be communicated between nodes promptly without deteriorating the transmission efficiency of the transmission data, is provided.

EMBODIMENTS FOR CARRYING OUT THE INVENTION

In the following, an embodiments of a communication system 1 according to an aspect of the present invention will be described with reference to FIGS. 1 to 21.

Figure 1:
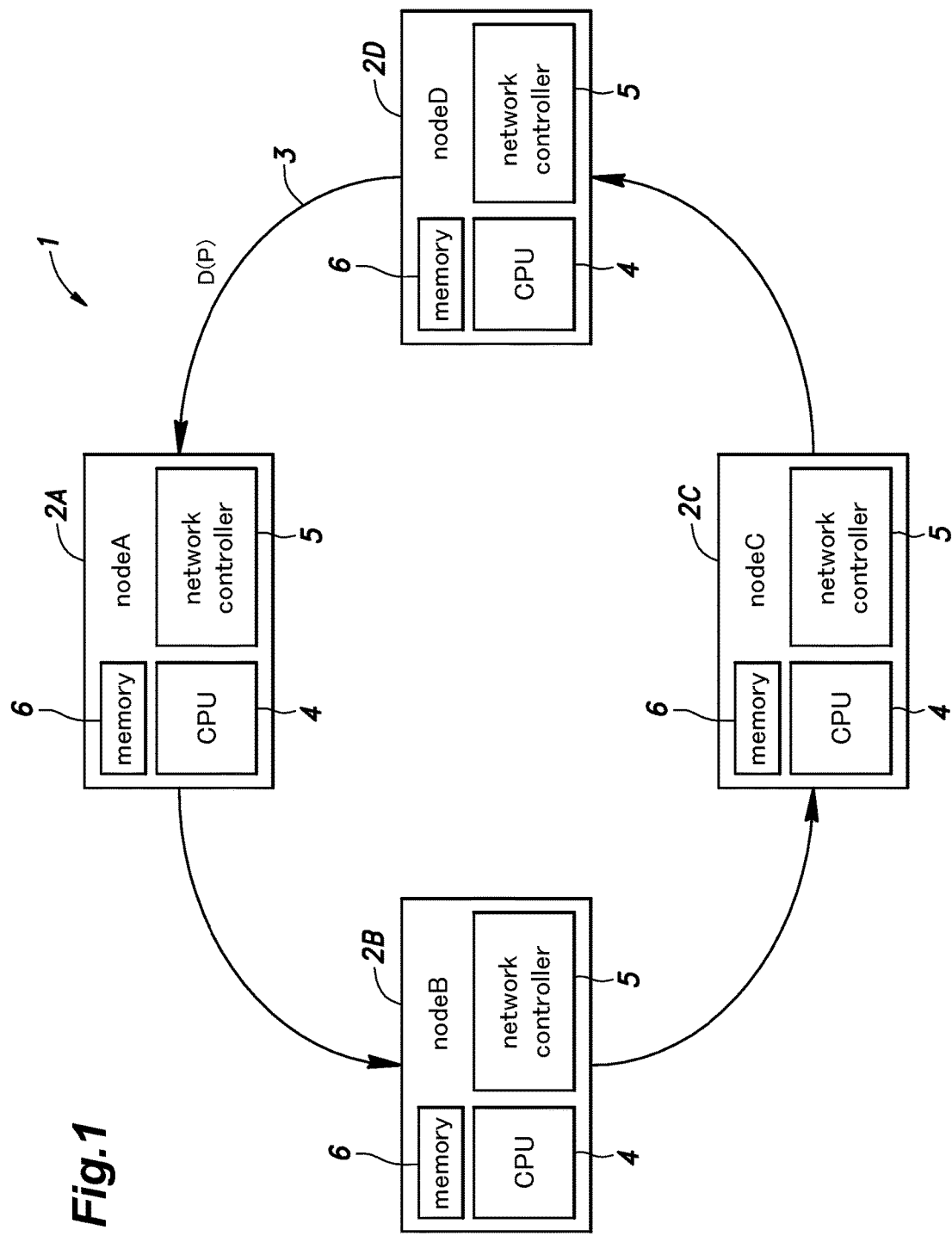
FIG. 1 is a schematic configuration diagram of a communication system according to an embodiment of the present invention.

As shown in FIG. 1, the communication system 1 is constituted of a plurality (four, in the illustrated example) of nodes 2 (2A, 2B, 2C, 2D) and a ring network 3 that communicably connects the nodes 2 in a ring fashion. In this communication system 1, each node 2 has a CPU 4 serving as an arithmetic processing unit, a memory 6 for storing software, and a network controller 5 configured to send data D in one direction along the ring of the network 3. Namely, the plurality of nodes 2 are communicably connected in a ring fashion via the ring network 3 such that the data is transmitted from one node to another in one direction along the ring.

It is to be noted that the ring network 3 is a network having a logical ring topology, and does not necessarily have to have a physical ring topology. Further, the "communicable connection" may be implemented as wireless connection instead of physical connection via communication wires.

Each of the plurality of nodes 2 is a control device that executes, with the CPU 4, arithmetic processing using software, and, based on the data output by the arithmetic processing, controls an associated control target 7 (FIG. 4) which consists of hardware. "Hardware" in this embodiment is an electric device electrically connected with a power supply, and may be, for example, an electric motor, a solenoid valve, a lighting apparatus, an electric element, or a driver for controlling the supply of power thereto. For instance, the communication system 1 is installed in a robot that operates autonomously or by remote control, such that the communication system 1 constitutes a distributed control system in which the nodes 2 control various parts of the robot. In this case, the power supply may be mounted on the robot or may not be mounted on the robot but connected to the robot via a power supply line.

There are two types of data D communicated on the network 3; namely, data used in ordinary control or data used in control of hardware performed by a later-described software-operated controller 9 (hereinafter referred to as ordinary data Dn) and interrupt data Di that is generated when it is desired to control the hardware without via the software-operated controller 9 and is prioritized than the ordinary data Dn. In principle, each data D (ordinary data Dn or interrupt data Di) is transmitted in the form of a packet P having a structure shown in FIG. 3 or FIG. 4 (hereinafter, a packet P containing ordinary data Dn will be referred to as an ordinary packet Pn, and a packet P containing interrupt data Di will be referred to as an interrupt packet Pi). An exceptional packet P will be described in detail later.

Figure 2:
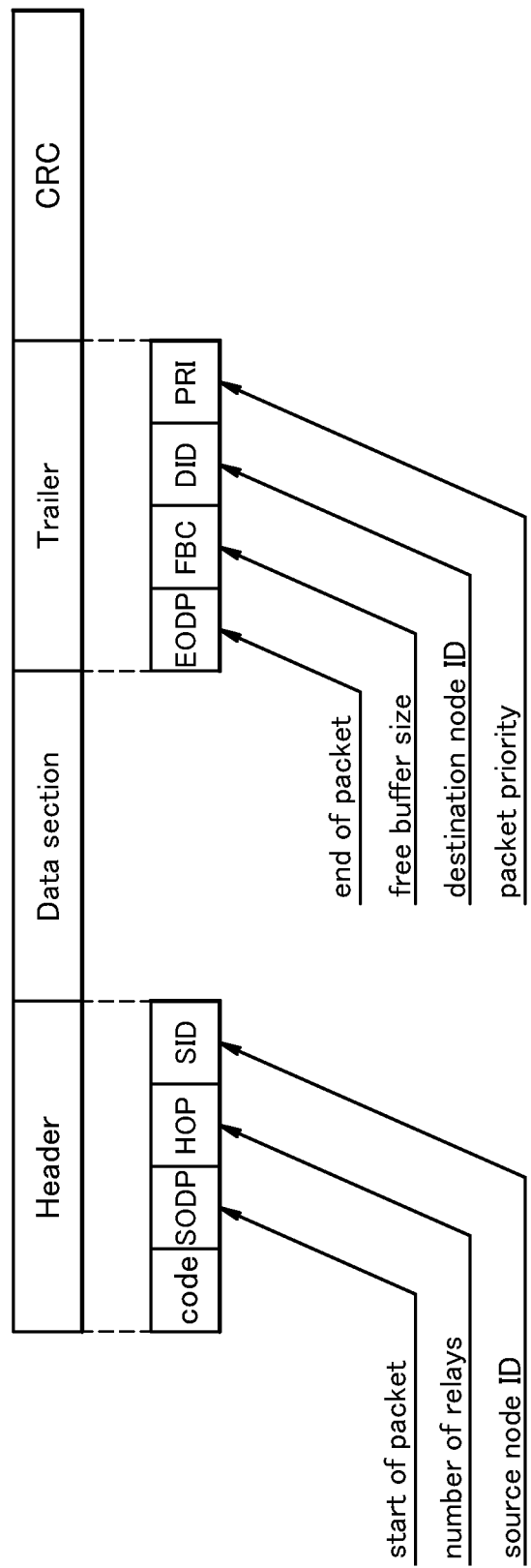
FIG. 2 is a configuration diagram of an ordinary packet.

As shown in FIG. 2, the packet P containing ordinary data Dn, namely, the ordinary packet Pn, is constituted of a frame including, from the top, a header, data section (ordinary data Dn), trailer, and CRC. The header is constituted of a code, start of packet (SODP), number of relays (hop count) (HOP), and source node ID (SID). The trailer is constituted of an end of packet (EODP), free buffer size (FBC), destination node ID (DID), and packet priority (PRI). There may be no limit to the size (bytes) of the data section such that all data D necessary for a series of instructions may be included in a single data section. Alternatively, the size of the data section in each frame may be limited to a predetermined size such that, if the size of all data D necessary for a series of instructions is larger than the predetermined size, the data section of one frame contains only one of the data pieces resulting from dividing of the data D. The position of the CRC is arbitrary and, for example, the positions of the trailer and the CRC may be reversed. Also, the CRC may be omitted. Namely, the ordinary packet Pn is constituted by adding at least the header and trailer to the ordinary data Dn.

Figure 3:
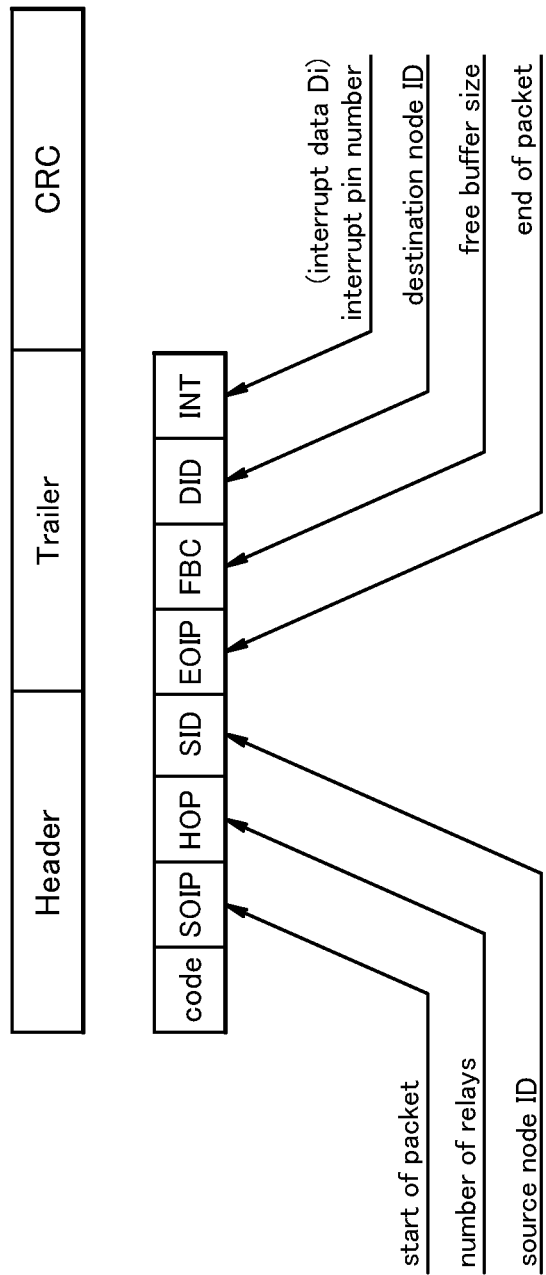
FIG. 3 is a configuration diagram of an interrupt packet.

On the other hand, the packet P containing interrupt data Di, namely, the interrupt packet Pi, is constituted of a frame including a header, trailer, and CRC, as shown in FIG. 3. Namely, the interrupt packet Pi of this embodiment does not include the data section shown in FIG. 2. The header of the interrupt packet Pi is constituted of a code, start of packet (SOIP), number of relays (HOP), and source node ID (SID), similarly to the header of the ordinary packet Pn. On the other hand, the trailer of the interrupt packet Pi is constituted of an end of packet (EOIP), free buffer size (FBC), destination node ID (DID), and interrupt pin number (INT). It is to be noted here that the start of packet (SOIP) and the end of packet (EOIP) of the interrupt packet Pi are different from the start of packet (SODP) and the end of packet (EODP) of the ordinary packet Pn, respectively, such that the start of packet (SOIP) and the end of packet (EOIP) of the interrupt packet Pi can be distinguished from the start of packet (SODP) and the end of packet (EODP) of the ordinary packet Pn. Since the interrupt packet Pi is transmitted in preference to the ordinary packet Pn as described above, the trailer of the interrupt packet Pi does not include the packet priority (PRI) shown in FIG. 2, but includes the interrupt pin number (INT) in place therefor. Namely, in the present embodiment, the interrupt pin number (INT) serves as the interrupt data Di and is incorporated in the trailer. Thereby, the interrupt packet Pi containing the interrupt data Di and having a header and a trailer is constituted. In the packet P containing the interrupt data Di also, the position of the CRC is arbitrary or the CRC may be omitted. It is to be noted that the interrupt pin number (INT) indicates an interrupt pin of hardware of another node to be controlled. It is also to be noted that each node may be associated with multiple items of hardware and each item of hardware may have multiple interrupt pins corresponding to different modes of operation. In such a case, the interrupt pin numbers can be predetermined such that one interrupt pin number specifies a specific interrupt pin of a specific item of hardware.

In another embodiment, data D including more information than the interrupt pin number (INT) may be used as the interrupt data Di, and the interrupt packet Pi may have a structure similar to that of the ordinary packet Pn, namely, a structure having a header added before the interrupt data Di and a trailer and CRC added after the interrupt data Di.

Figure 4:
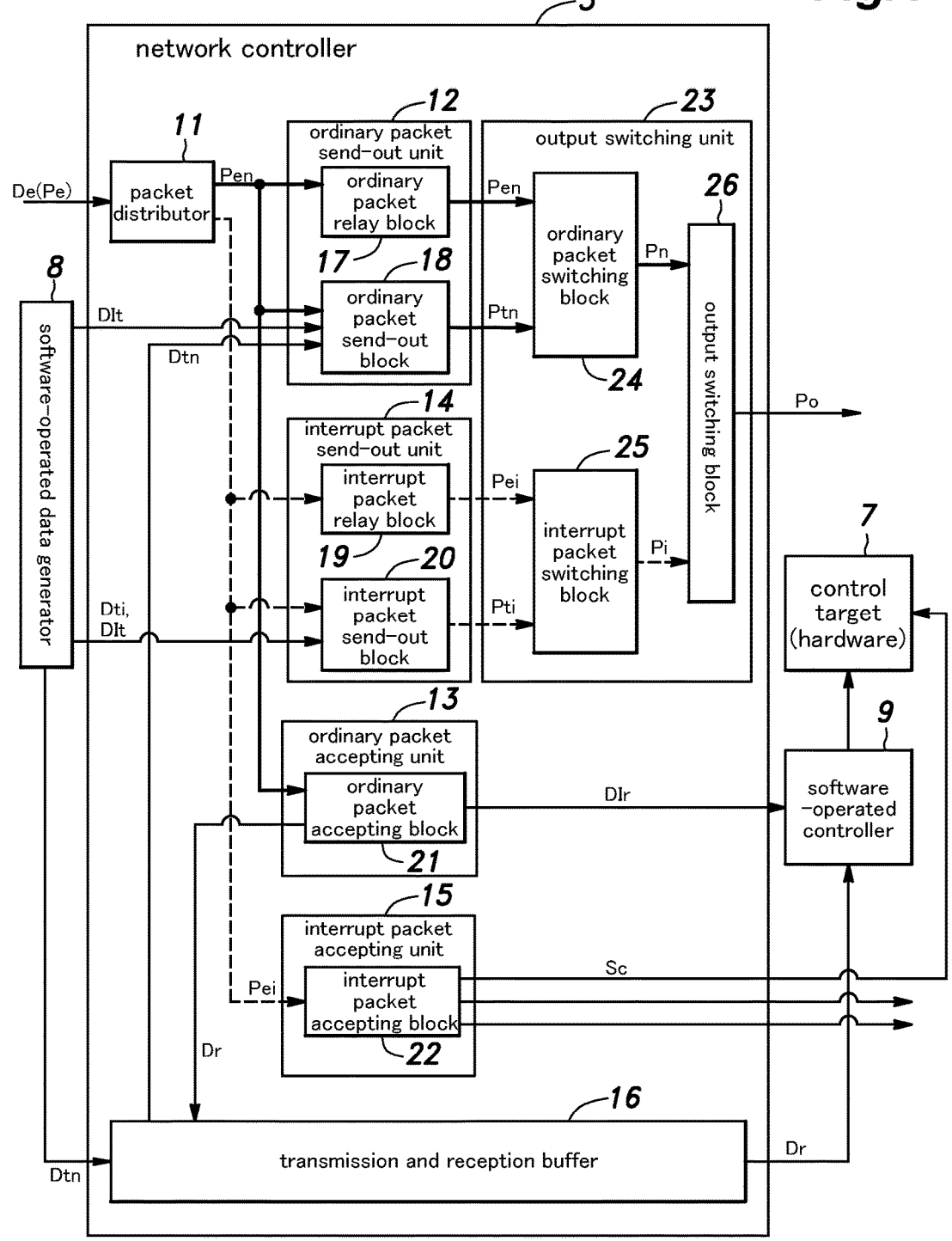
FIG. 4 is a functional block diagram of each node shown in FIG. 1.

As shown in FIG. 4, each node 2 includes: the aforementioned network controller 5 implemented by hardware; a software-operated data generator 8 which is a functional unit that executes, with the CPU 4, arithmetic processing using software to generate data D to be transmitted to another node 2 (hereinafter referred to as transmission data Dt) and data-related information such as a code and a priority to be added to the data D (hereinafter referred to as data information DI); and a software-operated controller 9 which is a functional unit that executes, with the CPU 4, arithmetic processing using software based on at least the data D (more specifically, ordinary data Dn) contained in the packet P transmitted from another node 2 and controls the control target 7 based on the data (control content) obtained by the arithmetic processing.

The software-operated data generator 8 generates, as transmission data Dt to be sent to other nodes 2, two types of data; namely, ordinary transmission data Dtn used in ordinary control (i.e., used in the control of the control target 7 (hardware) by the software-operated controller 9 of another node 2) and interrupt transmission data Dti that is used to control the hardware of another node 2 without via the software-operated controller 9 and is prioritized than the ordinary transmission data Dtn. In this description, the ordinary transmission data Dtn and the interrupt transmission data Dti respectively indicate the ordinary data Dn and the interrupt data Di generated by the software-operated data generator 8 of each node 2 and yet to be transmitted, and these terms are used to distinguish them from the ordinary data Dn and the interrupt data Di input to each node 2 from the network 3, which will be referred to as ordinary input data Den and interrupt input data Dei, respectively, as described later.

Further, the software-operated data generator 8 generates data information DI to be included in the header and trailer of the packet P containing the transmission data Dt (ordinary transmission data Dtn or interrupt transmission data Dti). The packet P containing the transmission data Dt and having the header and trailer (hereinafter referred to as a transmission packet Pt) includes two types; namely, an ordinary transmission packet Ptn containing ordinary transmission data Dtn with a header, trailer, etc. added thereto, and an interrupt transmission packet Pti containing interrupt transmission data Dti and having a header, trailer, etc. It is to be noted here that the interrupt transmission data Dti may be incorporated in the trailer as shown in FIG. 3 or the header and trailer may be added before and after the interrupt transmission data Dti.

In each node 2, the packet P containing the data D transmitted from an upstream-side node in the network 3 is input to the network controller 5. In the present description, the data D and the packet P input to each node 2 from another node 2 are referred to as input data De and an input packet Pe, respectively, to distinguish from the transmission data Dt and transmission packet Pt generated by the software-operated data generator 8 of the own node 2 and yet to be transmitted. The input data De also includes two types; namely, ordinary input data Den used in ordinary control (i.e., used in the control of the hardware by the software-operated controller 9 of the own or another node 2) and interrupt input data Dei that is used to control the hardware of the own or another node 2 without via the software-operated controller 9 and is prioritized than the ordinary input data Den. Likewise, the input packet Pe includes two types; namely, an ordinary input packet Pen containing ordinary input data Den with a header, trailer, etc. added thereto, and an interrupt input packet Pei containing interrupt input data Dei and having a header, trailer, etc.

The network controller 5 includes a packet distributor 11 that distributes the input packet Pe containing the input data De to later-described various units (blocks) of the own node 2. In a case where the start of packet contained in the header of the input packet Pe is SODP (refer to FIG. 2), the packet distributor 11 recognizes the data segment from the header to the trailer containing the end of packet consisting of EODP (or to the CRC when the CRC is added after the trailer) as a single ordinary input packet Pen in principle. In a case where the start of packet contained in the header of the input packet Pe is SOIP (refer to FIG. 3), the packet distributor 11 recognizes the data segment from the header to the trailer containing the end of packet consisting of EOIP (or to the CRC when the CRC is added to the trailer) as a single interrupt input packet Pei in principle. Exceptions will be described later. In FIG. 4, the ordinary input packet Pen containing the ordinary input data Den and distributed from the packet distributor 11 is shown by bold lines while the interrupt input packet Pei containing the interrupt input data Dei and distributed from the packet distributor 11 is shown by broken lines.

In a case where the packet P input to the packet distributor 11 is a standard ordinary input packet Pen (namely, having the structure shown in FIG. 2), the packet distributor 11 distributes the ordinary input packet Pen to each of an ordinary packet send-out unit 12 and an ordinary packet accepting unit 13. On the other hand, in a case where the packet P input to the packet distributor 11 is a standard interrupt input packet Pei (namely, having the structure shown in FIG. 3), the packet distributor 11 distributes the interrupt input packet Pei to each of an interrupt packet send-out unit 14 and an interrupt packet accepting unit 15. The packet distribution by the packet distributor 11 in a case where the input packet P is an exceptional input packet will be described in detail later after description of an output packet Po that is output from an output switching unit 23.

The software-operated data generator 8 writes the generated ordinary transmission data Dtn addressed to another node 2 in a transmission and reception buffer 16, and writes the data information DI of the ordinary transmission data Dtn (hereinafter referred to as transmission data information DIt) in the ordinary packet send-out unit 12 (more specifically, in a transmission data information storage buffer 40, which will be described later with reference to FIG. 6).

Further, the software-operated data generator 8 writes the generated interrupt transmission data Dti (interrupt pin number (INT)) addressed to another node 2 and the transmission data information DIt thereof in the interrupt packet send-out unit 14 (more specifically, in a first write register 71 of an interrupt packet send-out block 20, which will be described later with reference to FIG. 10).

The ordinary packet send-out unit 12 includes an ordinary packet relay block 17 and an ordinary packet send-out block 18. The ordinary packet relay block 17 is configured to, when the destination of the ordinary input packet Pen distributed from the packet distributor 11 is not the own node, send out the ordinary input packet Pen as it is. The ordinary packet send-out block 18 is configured to send out the ordinary transmission data Dtn generated by the software-operated data generator 8 to be addressed to another node 2, after converting it to the ordinary transmission packet Ptn. The ordinary packet send-out block 18 reads out, from the transmission and reception buffer 16, the ordinary transmission data Dtn corresponding to the transmission data information DIt written by the software-operated data generator 8, and adds a header, trailer, and CRC to the ordinary transmission data Dtn to generate the ordinary transmission packet Ptn. Further, the ordinary packet send-out block 18 performs a later-described transmission completion determination based on the ordinary input packet Pen distributed from the packet distributor 11.

The interrupt packet send-out unit 14 includes an interrupt packet relay block 19 and an interrupt packet send-out block 20. The interrupt packet relay block 19 is configured to, when the destination of the interrupt input packet Pei distributed from the packet distributor 11 is not the own node, send out the interrupt input packet Pei as it is. The interrupt packet send-out block 20 is configured to send out the interrupt transmission data Dti generated by the software-operated data generator 8 to be addressed to another node 2, after converting it to the interrupt transmission packet Pti. The interrupt packet send-out block 20 generates the ordinary transmission packet Ptn by adding a header, trailer, and CRC to the interrupt transmission data Dti (to be exact, incorporating the interrupt transmission data Dti in the trailer).

The ordinary packet accepting unit 13 includes an ordinary packet accepting block 21. When the destination of the ordinary input packet Pen distributed from the packet distributor 11 is the own node and hence the ordinary input packet Pen should be accepted, the ordinary packet accepting block 21 accepts the ordinary input packet Pen and writes the ordinary input data Den contained therein in the transmission and reception buffer 16 as reception data Dr.

The interrupt packet accepting unit 15 includes an interrupt packet accepting block 22. When the destination of the interrupt input packet Pei distributed from the packet distributor 11 is the own node, the interrupt packet accepting block 22 accepts the interrupt input packet Pei and sends out a hardware control signal Sc to the hardware in accordance with the interrupt data Di (interrupt pin number (INT), see FIG. 3) contained in the accepted interrupt input packet Pei.

The ordinary input packet Pen sent out from the ordinary packet relay block 17, the ordinary transmission packet Ptn sent out from the ordinary packet send-out block 18, the interrupt input packet Pei sent out from the interrupt packet relay block 19, and the interrupt transmission packet Pti sent out from the interrupt packet send-out block 20 are input to an output switching unit 23.

In the output switching unit 23, an ordinary packet switching block 24 outputs one of the ordinary input packet Pen and the ordinary transmission packet Ptn that has an earlier input timing as the ordinary packet P to be sent out to another node 2. Specifically, when one of the ordinary input packet Pen and the ordinary transmission packet Ptn is input, the ordinary packet switching block 24 outputs the input packet as the ordinary packet Pn to be sent out, and when the ordinary input packet Pen and the ordinary transmission packet Ptn are input simultaneously, the ordinary packet switching block 24 switches the output ordinary packet Pn between the ordinary input packet Pen and the ordinary transmission packet Ptn such that the ordinary transmission packet Ptn is output with priority (earlier).

Further, in the output switching unit 23, an interrupt packet switching block 25 outputs one of the interrupt input packet Pei and the interrupt transmission packet Pti that has an earlier input timing as the interrupt packet Pi to be sent out to another node 2, and conducts switching of the output interrupt packet Pi between the interrupt input packet Pei and the interrupt transmission packet Pti. Similarly to the ordinary packet switching block 24, the interrupt packet switching block 25 outputs the interrupt transmission packet Pti with priority (earlier) when the interrupt input packet Pei and the interrupt transmission packet Pti are input simultaneously.

Further, in the output switching unit 23, an output switching block 26 outputs, in principle, one of the ordinary packet Pn output from the ordinary packet switching block 24 and the interrupt packet Pi output from the interrupt packet switching block 25 as an output packet Po. Specifically, when one of the ordinary packet Pn and the interrupt packet Pi is input, the output switching block 26 outputs the input packet P (ordinary packet Pn or interrupt packet Pi) as an output packet Po. On the other hand, when the ordinary packet Pn and the interrupt packet Pi are input simultaneously (when the interrupt packet Pi is input while the output of the ordinary packet Pn is in progress), the output switching block 26 outputs, as an exception, the interrupt packet Pi by embedding it in the ordinary packet Pn that is being output. Namely, the output packet Po in this case consists of the ordinary packet Pn and the interrupt packet Pi embedded therein. Details of the embedding will be described later.

It is to be noted that not all of the nodes 2 necessarily have to include all functional units described above. For example, it is possible that one node 2 is configured to generate interrupt transmission data Dti with the software-operated data generator 8 and to include the interrupt packet send-out block 20, while another node 2 is configured not to include the interrupt packet send-out block 20 and the interrupt packet switching block 25. However, each node 2 is configured to include the functional units necessary to implement the ring network 3; namely, the packet distributor 11, the ordinary packet relay block 17, the interrupt packet relay block 19, and the output switching block 26.

In the following, detailed explanation will be made of various parts of the node 2.

Figure 5:
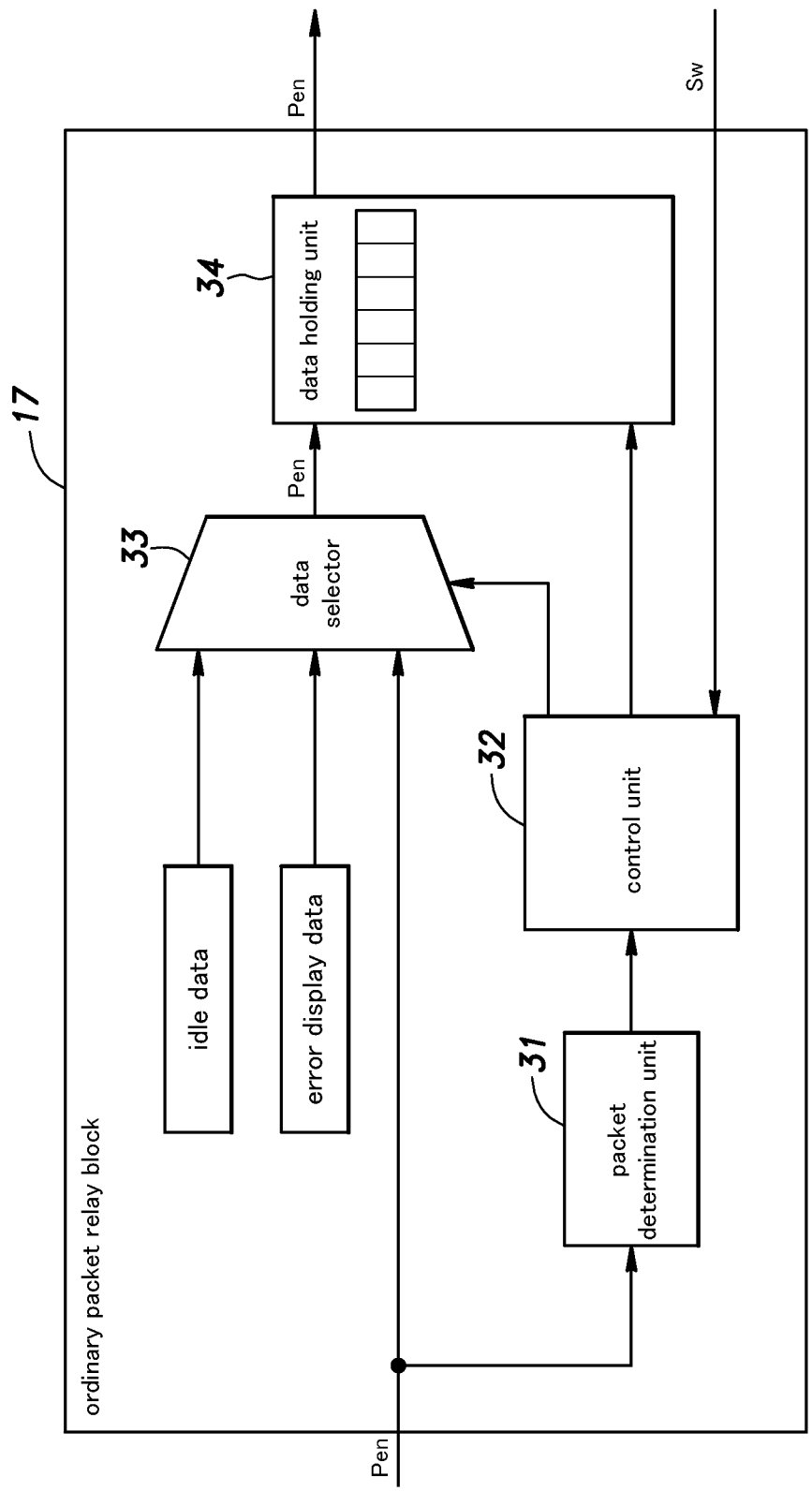
FIG. 5 is a functional block diagram of an ordinary packet relay block shown in FIG. 4.

As shown in FIG. 5, in the ordinary packet relay block 17 (see FIG. 4), a packet determination unit 31 performs a relay determination with respect to the ordinary input packet Pen. Specifically, the packet determination unit 31 determines, based on the source node ID (SID) included in the transmission data information DIt of the ordinary input packet Pen, whether the ordinary input packet Pen is a packet P generated by the own node. Further, the packet determination unit 31 determines whether there is a relay error based on the number of relays (HOP) included in the transmission data information DIt, specifically, based on whether the number of relays is greater than or equal to the number of nodes 2 in the network 3.

Based on the result of determination by the packet determination unit 31, a control unit 32 relays or discards the ordinary input packet Pen. Specifically, when the ordinary input packet Pen is a packet P generated by the own node, the control unit 32 discards the ordinary input packet Pen as a packet that has circulated one round through the ring of the network 3. Further, when the number of relays of the ordinary input packet Pen is greater than or equal to the number of nodes 2, the control unit 32 discards the ordinary input packet Pen as an abnormal packet, and adds error display data. It is to be noted that an output standby signal Sw is input to the control unit 32 from a later-described control unit 62 (see FIG. 8) of the ordinary packet switching block 24.

On the other hand, when it is determined by the packet determination unit 31 that the ordinary input packet Pen is normal and should be relayed, the control unit 32 increments the number of relays of the ordinary input packet Pen, and controls data selection performed by a data selector 33 such that the data selector 33 selects the ordinary input packet Pen as a packet to be output. Further, the control unit 32 controls data input and output in relation to a data holding unit 34 in accordance with the output standby signal Sw. The data selector 33 selects one of idle data, error display data and ordinary input packet Pen in accordance with an instruction from the control unit 32, and writes the ordinary input packet Pen in the data holding unit 34. When the control unit 32 outputs a data output instruction in a state where the output standby signal Sw is not input to the control unit 32, the data holding unit 34 sends out the ordinary input packet Pen held therein.

The control unit 32 of the ordinary packet relay block 17 is configured by hardware programmed to perform the above-described predetermined operations. As the hardware implementing the control unit 32, a hardware logic circuit such as an ASIC (Application Specific Integrated Circuit), PLD (Programmable Logic Device), ASSP (Application Specific Standard Product), etc. may be used. When an ASIC is used, it may be a master slice type such as a gate array, a structured ASIC and so on or may be a custom type such as a cell-based ASIC, etc. When a PLD is used, it may be a PLD in a narrow sense including a Simple PLD and a CPLD (Complex PLD) or may be a PLD in a wide sense which further includes an FPGA (Field-Programmable Gate Array). Preferably, the hardware consists of a PLD. Also, each of the later-described control units 42, 52, 62, 73, 82 of various units (blocks) of the network controller 5 is configured by hardware in a similar manner.

Figure 6:
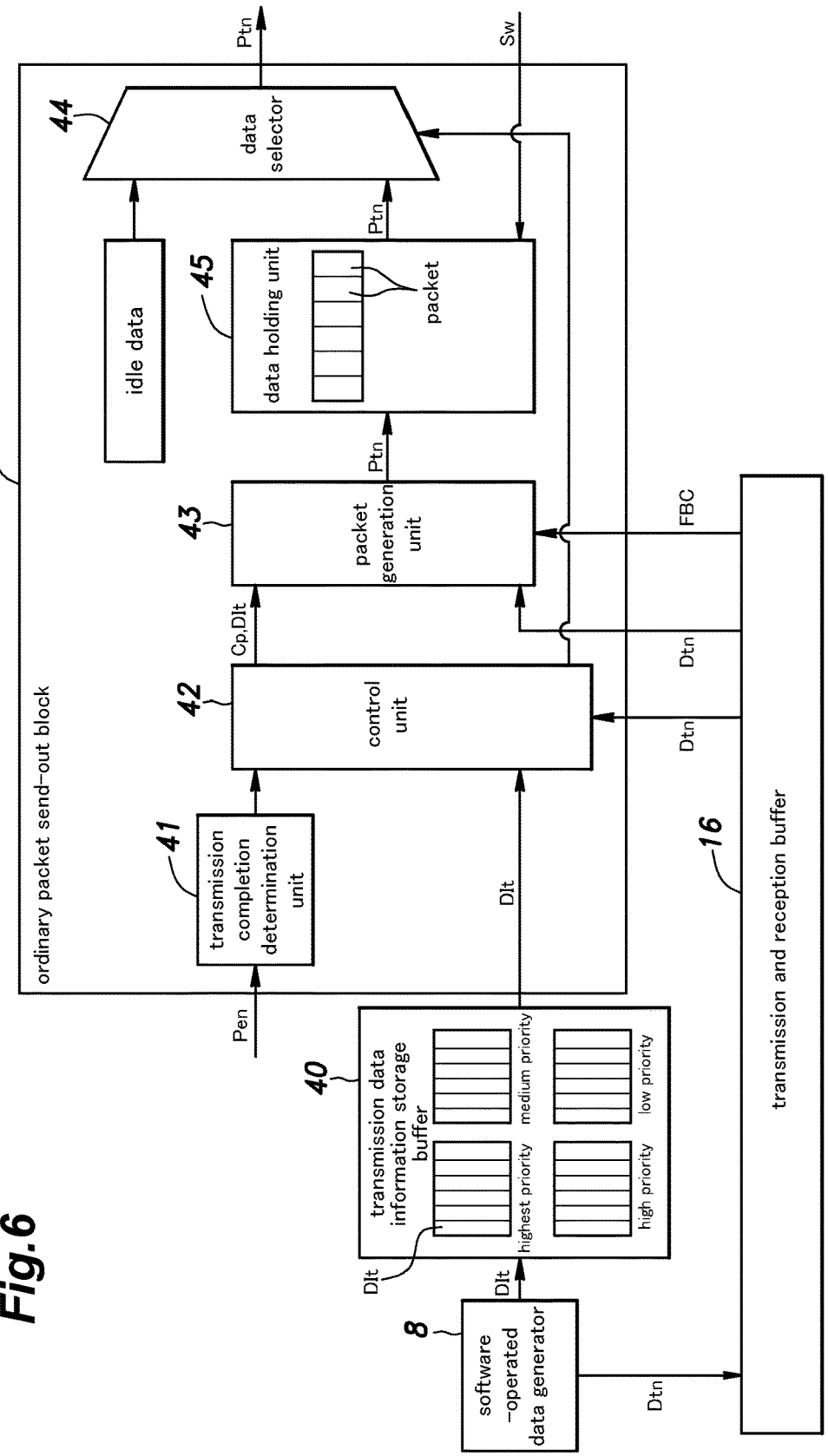
FIG. 6 is a functional block diagram of an ordinary packet send-out block shown in FIG. 4.

As shown in FIG. 6, the ordinary packet send-out block 18 (see FIG. 4) is configured to receive the ordinary input packet Pen distributed from the packet distributor 11. The ordinary packet send-out block 18 includes a transmission completion determination unit 41 that performs transmission completion determination based on the ordinary input packet Pen. Specifically, when the ordinary input packet Pen is identical with the ordinary transmission packet Ptn previously transmitted from the own node, namely, when it is determined that the ordinary transmission packet Ptn previously generated by the own node has returned after circulating the ring of the network 3 one round, the transmission completion determination unit 41 determines that the transmission of the ordinary transmission packet Ptn is completed. The result of determination by the transmission completion determination unit 41 is sent to a control unit 42.

A transmission data information storage buffer 40 is provided to store the transmission data information DIt of the ordinary transmission data Dtn generated by the software-operated data generator 8. As described above, each ordinary transmission data Dtn is given a certain level of priority (e.g., highest priority, high priority, medium priority, low priority, etc.) by the software-operated data generator 8. In the ordinary packet send-out block 18, the control unit 42 retrieves items of transmission data information DIt stored in the transmission data information storage buffer 40 in a queue according to the priority, such that one with a higher priority is retrieved earlier, and reads out an item of ordinary transmission data Dtn corresponding to the retrieved item of transmission data information DIt from the transmission and reception buffer 16. The control unit 42 further generates packet generation command Cp and sends out the packet generation command Cp to a packet generation unit 43 together with the transmission data information DIt. The control unit 42 controls the above process such that, until the transmission completion determination unit 41 determines that the transmission of a previously transmitted ordinary transmission packet Ptn has been completed, the ordinary transmission data Dtn to be transmitted next is not read out from the transmission and reception buffer 16. Further, the control unit 42 controls data selection performed by a later-described data selector 44.

The packet generation unit 43 reads out ordinary transmission data Dtn from the transmission and reception buffer 16 in response to the packet generation command Cp from the control unit 42, and generates an ordinary transmission packet Ptn by adding, to the ordinary transmission data Dtn, a header, trailer and CRC based on the transmission data information DIt. In this process, the packet generation unit 43 reads in related information such as a free buffer size (FBC) from the transmission and reception buffer 16 and embeds the information in the ordinary transmission packet Ptn. The ordinary transmission packet Ptn generated by the packet generation unit 43 is temporarily held in a data holding unit 45 and, if the output standby signal Sw from the control unit 62 (see FIG. 8) of the ordinary packet switching block 24 is not input to the data holding unit 45, sent out to the data selector 44. The data selector 44 selects one of idle data and the ordinary transmission packet Ptn in accordance with the command from the control unit 42 and sends out the selected data as an ordinary transmission packet Ptn.

Figure 7:
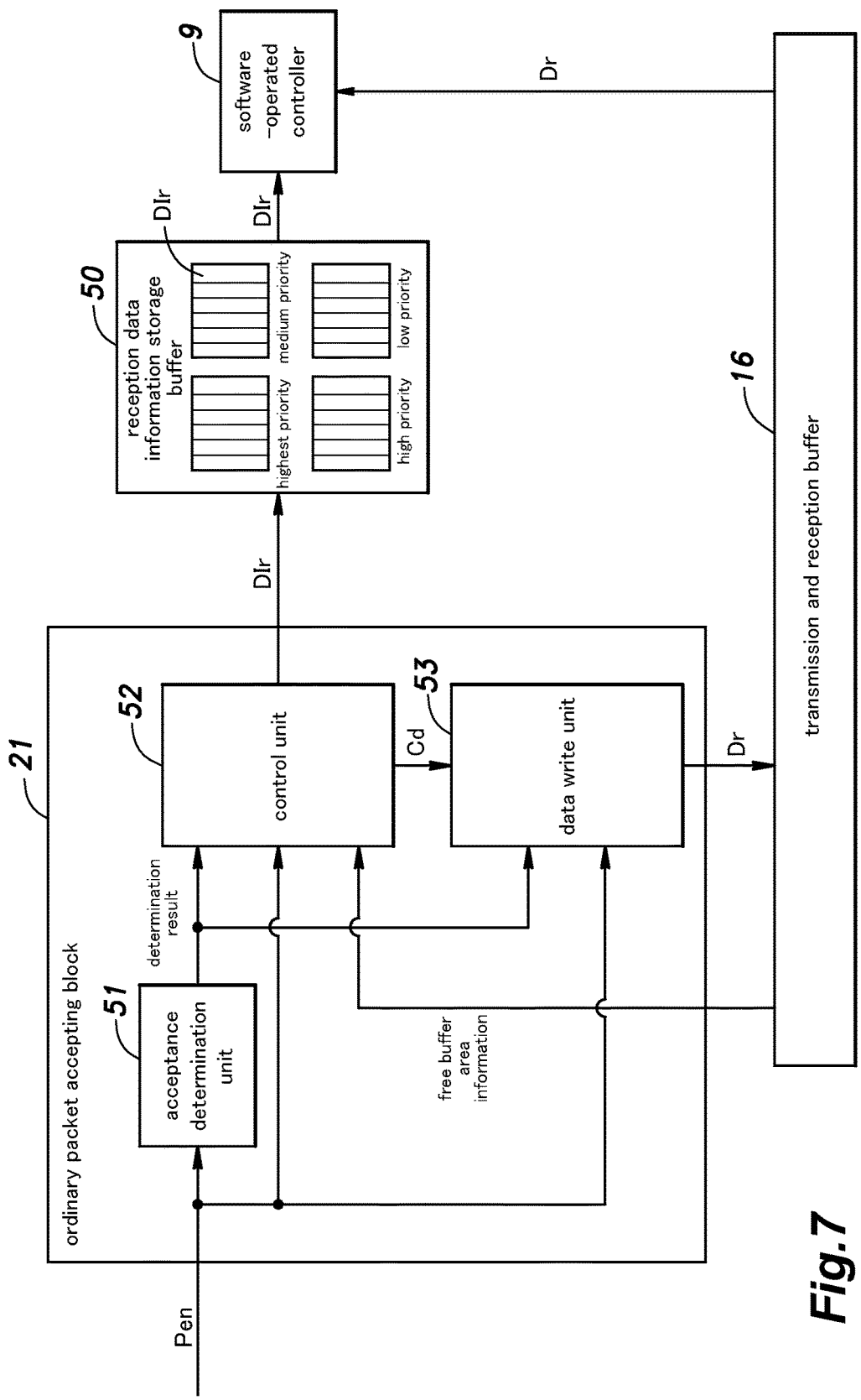
FIG. 7 is a functional block diagram of an ordinary packet accepting block shown in FIG. 4.

As shown in FIG. 7, in the ordinary packet accepting block 21 (see FIG. 4), an acceptance determination unit 51 analyzes the ordinary input packet Pen that has been input, and executes an acceptance determination to determine whether to accept the ordinary input packet Pen. Specifically, the acceptance determination unit 51 determines to accept the ordinary input packet Pen when the destination node ID (DID) of the ordinary input packet Pen indicates the own node, and determines not to accept the ordinary input packet Pen when the destination node ID does not indicate the own node.

In the ordinary packet accepting block 21, a control unit 52 acquires, from the transmission and reception buffer 16, information on the free (or writable) buffer area in the transmission and reception buffer 16. When the control unit 52 is provided with a determination result from the acceptance determination unit 51 that the ordinary input packet Pen that has been input should be accepted, the control unit 52 sends out a buffer write command Cd to a data write unit 53, the buffer write command Cd specifying where in the free buffer area the ordinary input data Den contained in the ordinary input packet Pen should be written. Upon receipt of the determination result from the acceptance determination unit 51 that the ordinary input packet Pen should be accepted and the buffer write command Cd from the control unit 52, the data write unit 53 writes the ordinary input data Den at the specified position in the transmission and reception buffer 16 as reception data Dr.

Further, the control unit 52 adds the write position in the buffer to the information relating to the reception data Dr (or the ordinary input data Den that has been input) (hereinafter referred to as reception data information DIr), and checks the priority (PRI) included in the reception data information DIr to write the reception data information DIr in a reception data information storage buffer 50 to form a queue in which items of reception data information DIr written in the buffer 50 are arranged in accordance with their priorities. The items of reception data information DIr written in the reception data information storage buffer 50 are retrieved by the software-operated controller 9 in the descending order of priority (namely, an item of reception data information DIr with a higher priority is retrieved earlier).

The software-operated controller 9 reads out, from the transmission and reception buffer 16, the reception data Dr corresponding to the retrieved reception data information DIr, and, based on at least the read-out reception data Dr, controls the hardware serving as the control target 7 (FIG. 4). For example, the software-operated controller 9 controls a motor driver for regulating the supply power provided to an electric motor for driving a joint of a robot.

Figure 8:
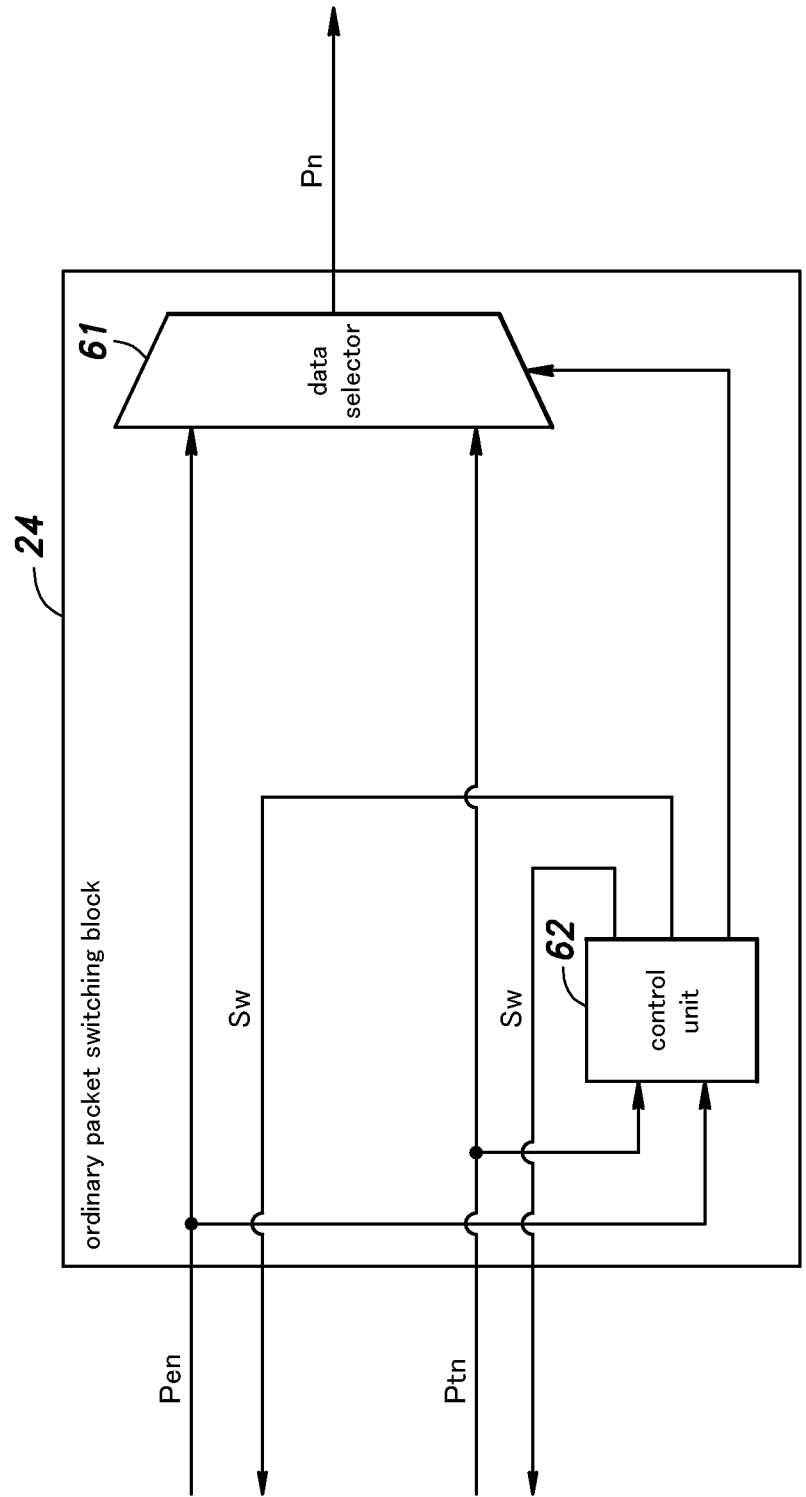
FIG. 8 is a functional block diagram of an ordinary packet switching block shown in FIG. 4.

As shown in FIG. 8, the ordinary packet switching block 24 (see FIG. 4) is configured to receive the ordinary input packet Pen sent out from the data holding unit 34 of the ordinary packet relay block 17 (FIG. 5) and the ordinary transmission packet Ptn sent out from the data selector 44 of the ordinary packet send-out block 18 (FIG. 6). The ordinary packet switching block 24 includes a data selector 61 and a control unit 62, to each of which the ordinary input packet Pen and the ordinary transmission packet Ptn are input. The control unit 62 controls data selection performed by the data selector 61 based on the ordinary input packet Pen and the ordinary transmission packet Ptn input thereto, and outputs an output standby signal Sw for each of the ordinary packet relay block 17 (FIG. 5) and the ordinary packet send-out block 18 (FIG. 6).

The data selector 61 selects one of the ordinary input packet Pen and the ordinary transmission packet Ptn in accordance with an instruction from the control unit 62, and outputs the selected packet as the ordinary packet Pn to be sent out. The control unit 62 outputs the instruction so as to cause the data selector 61 to output the ordinary transmission packet Ptn more preferentially than the ordinary input packet Pen. Further, while one of the ordinary input packet Pen and the ordinary transmission packet Ptn is being output, in order to prevent collision with input of the other, the control unit 62 outputs the output standby signal Sw to the ordinary packet relay block 17 or the ordinary packet send-out block 18 until the data output of one packet is completed.

Figure 9:
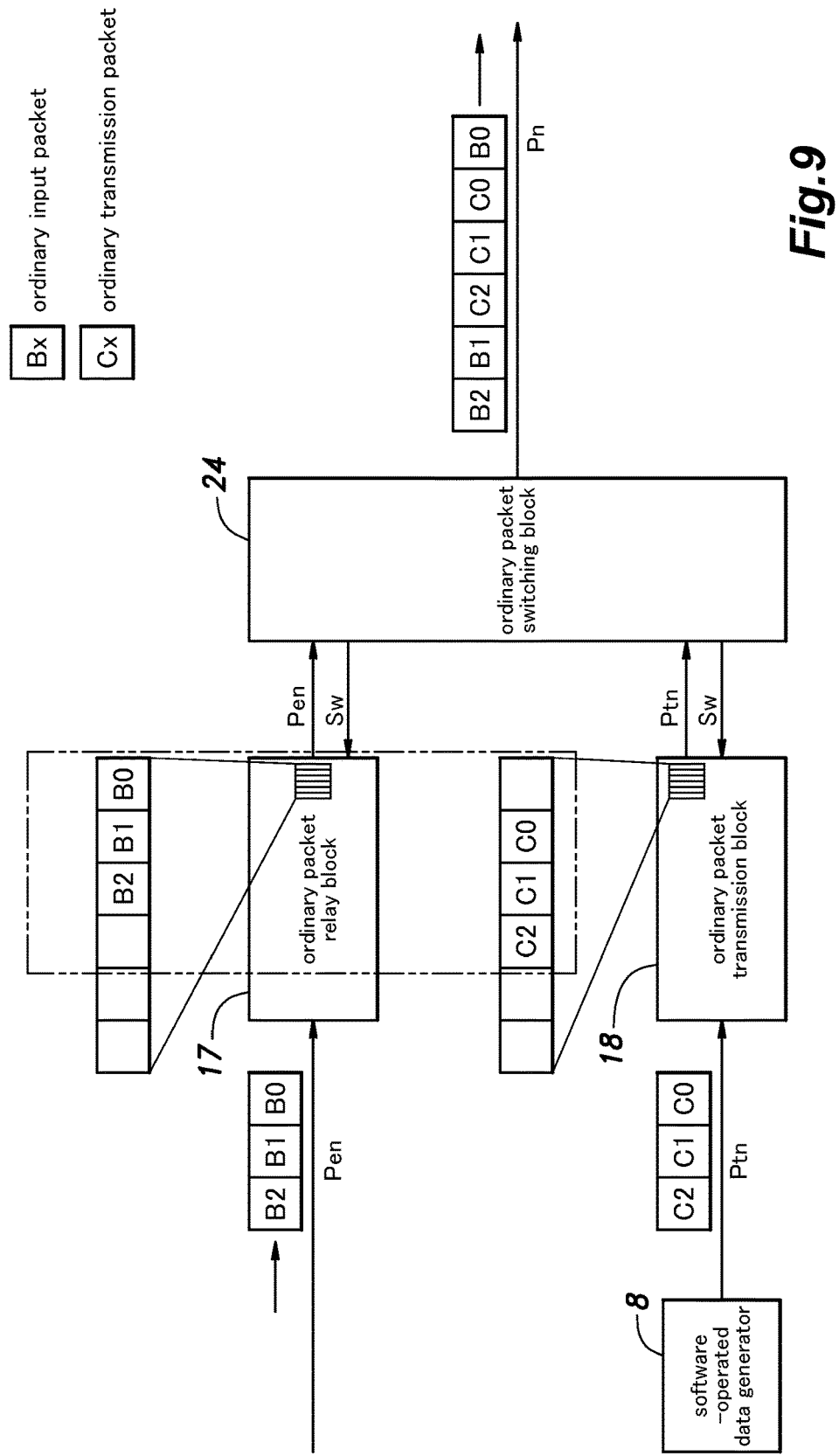
FIG. 9 is an explanatory diagram for explaining output switching performed by the ordinary packet switching block shown in FIG. 4.

With reference to FIG. 9, description will be made of a concrete example of the operation of the ordinary packet relay block 17, ordinary packet send-out block 18 and ordinary packet switching block 24. In the example shown in FIG. 9, packets B0, B1 and B2 each being an ordinary input packet Pen transmitted from another node 2 are input to the ordinary packet relay block 17 in this order as packets to be relayed. On the other hand, packets C0, C1, C2 each being an ordinary transmission packet Ptn are input from the software-operated data generator 8 to the ordinary packet send-out block 18 in this order at such a timing that the packet C0 is input simultaneously with the packet B1 (actually, items of transmission data information DIt are input from the software-operated data generator 8 to the ordinary packet send-out block 18 and the ordinary packet send-out block 18 generates the ordinary transmission packets Ptn based thereon, but in FIG. 9, the ordinary transmission packets Ptn (C0, C1, C2) are shown as being input from the software-operated data generator 8 for the sake of simplicity of illustration).

In this case, after outputting the packet B0, which is the ordinary input packet Pen input first, the ordinary packet switching block 24 does not output the packets B (B1, B2), which are ordinary input packets Pen, and instead preferentially outputs the packets C (C0, C1, C2) each being an ordinary transmission packet Ptn. Then, after the output of the packets C each being an ordinary transmission packet Ptn is completed, the ordinary packet switching block 24 outputs the packets B1, B2 each being an ordinary input packet Pen. By thus switching the output data (packet) by the ordinary packet switching block 24, collisions of the packets are avoided.

Though detailed illustration in the drawings is omitted, it should be appreciated that the interrupt packet relay block 19 (see FIG. 4) has a function similar to that of the ordinary packet relay block 17 (FIG. 4, FIG. 5). Specifically, in the interrupt packet relay block 19, a packet determination unit performs a relay determination with respect to the interrupt input packet Pei based on the source node ID (SID) and the number of relays (HOP). Based on the result of determination by the packet determination unit, a control unit relays or discards the interrupt input packet Pei. Not all of the specific functions of the functional units of the interrupt packet relay block 19 are described here because they are similar to those of the corresponding functional units of the ordinary packet relay block 17. However, it should be appreciated that in the interrupt packet relay block 19, when it is determined by the packet determination unit that the interrupt input packet Pei is normal and should be relayed, the control unit increments the number of relays of the interrupt input packet Pei and thereafter sends out the interrupt input packet Pei.

Figure 10:
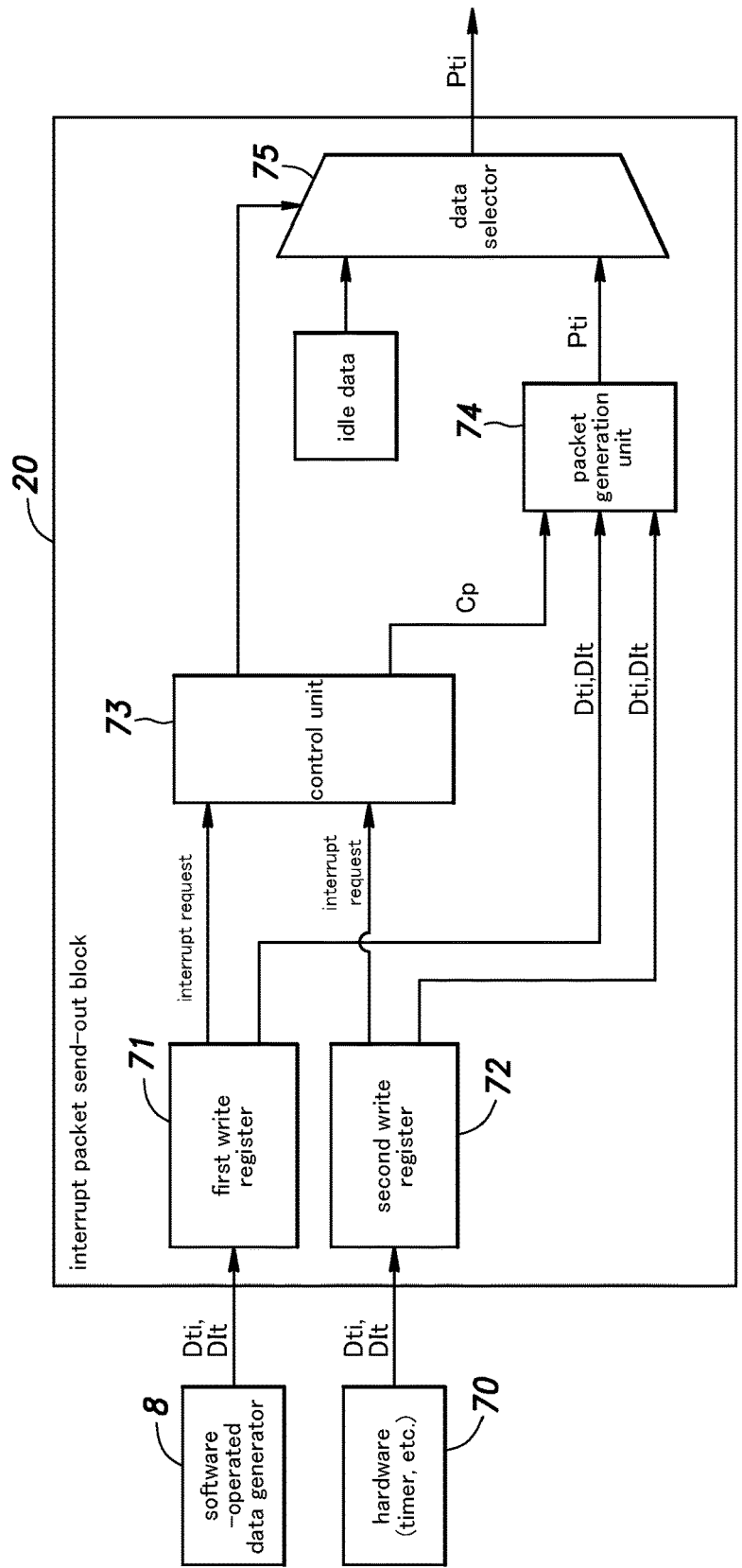
FIG. 10 is a functional block diagram of an interrupt packet send-out block shown in FIG. 4.

As shown in FIG. 10, the interrupt packet send-out block 20 (see FIG. 4) is configured to receive the interrupt transmission data Dti and transmission data information DIt therefor generated by the software-operated data generator 8. The interrupt packet send-out block 20 is also configured to receive the interrupt transmission data Dti and transmission data information DIt therefor sent out from other hardware 70 such as a timer. The interrupt transmission data Dti and transmission data information DIt input from the software-operated data generator 8 are written in a first write register 71. On the other hand, the interrupt transmission data Dti and transmission data information DIt input from the hardware 70 are written in a second write register 72.

In the interrupt packet send-out block 20, a control unit 73 is configured to receive the interrupt transmission data Dti and transmission data information DIt written in each of the first write register 71 and the second write register 72 as an interrupt request, and upon receipt of the interrupt request, send out a packet generation command Cp to a packet generation unit 74. In such an operation, the control unit 73 accepts the interrupt request from the second write register 72 more preferentially than the interrupt request from the first write register 71. Further, the control unit 73 controls data selection performed by a later-described data selector 75.

Upon receipt of the packet generation command Cp, the packet generation unit 74 reads out the interrupt transmission data Dti and transmission data information DIt from the first write register 71 or the second write register 72 that corresponds to the packet generation command Cp, and generates an interrupt transmission packet Pti containing the read-out interrupt transmission data Dti and having a header, trailer and CRC in which the transmission data information DIt is embedded. More specifically, in the present embodiment, the interrupt transmission data Dti is incorporated in the trailer of the generated interrupt transmission packet Pti, as shown in FIG. 3. The packet generation unit 74 sends out the generated interrupt transmission packet Pti to the data selector 75. The data selector 75 selects one of idle data and the interrupt transmission packet Pti in accordance with an instruction from the control unit 73 and sends out the selected data or packet as an interrupt transmission packet Pti. It is to be noted that an output standby signal Sw such as that input to the ordinary packet relay block 17 (FIG. 5) or the ordinary packet send-out block 18 (FIG. 6) is not input to the interrupt packet send-out block 20.

Though detailed illustration in the drawings is omitted, the interrupt packet switching block 25 shown in FIG. 4 has an output switching function similar to that of the ordinary packet switching block 24 (FIG. 4, FIG. 8) but the output switching function of the interrupt packet switching block 25 relates to the interrupt input packet Pei sent out from the interrupt packet relay block 19 and the interrupt transmission packet Pti sent out from the interrupt packet send-out block 20. Specifically, the interrupt packet switching block 25 includes a data selector and a control unit, to each of which the input packet Pei and the interrupt transmission packet Pti are input, and the control unit controls data selection performed by the data selector based on the interrupt input packet Pei and the interrupt transmission packet Pti input thereto. The data selector selects one of the interrupt input packet Pei and the interrupt transmission packet Pti in accordance with an instruction from the control unit, and outputs the selected packet as an interrupt packet Pi to be sent out. The control unit outputs the instruction so as to cause the data selector to output the interrupt transmission packet Pti more preferentially than the interrupt input packet Pei.

The output switching block 26 shown in FIG. 4 has an output switching function similar to that of the ordinary packet switching block 24 or the interrupt packet switching block 25 but the output switching function of the output switching block 26 relates to the ordinary packet Pn sent out from the ordinary packet switching block 24 (FIG. 4, FIG. 8) and the interrupt packet Pi sent out from the interrupt packet switching block 25 (FIG. 4). In addition, the output switching block 26 has a function of embedding the interrupt packet Pi into the ordinary packet Pn to output it right away. The output switching block 26 includes a data selector and a control unit, to each of which the ordinary packet Pn and the interrupt packet Pi are input, and the control unit controls data selection performed by the data selector based on the ordinary packet Pn and the interrupt packet Pi input thereto.

The control unit outputs an instruction so as to cause the data selector to output the interrupt packet Pi more preferentially than the ordinary packet Pn. For example, in a case where, while an interrupt packet Pi is being output as an output packet Po, an ordinary packet Pn and a next interrupt packet Pi are input (waiting for output), the control unit outputs an instruction to the data selector to output, after completion of the output of the interrupt packet Pi that is being output, the next interrupt packet Pi before the ordinary packet Pn. In a case where, while an interrupt packet Pi is being output as an output packet Po, only an ordinary packet Pn is input, the control unit outputs an instruction to the data selector to output the ordinary packet Pn after completion of the interrupt packet Pi that is being output. On the other hand, in a case where, while an ordinary packet Pn is being output as an output packet Po, an interrupt packet Pi is input, the control unit outputs an instruction to the data selector to embed the interrupt packet Pi into the ordinary packet Pn that is being output such that they are output as a single output packet Po.

Figure 11:
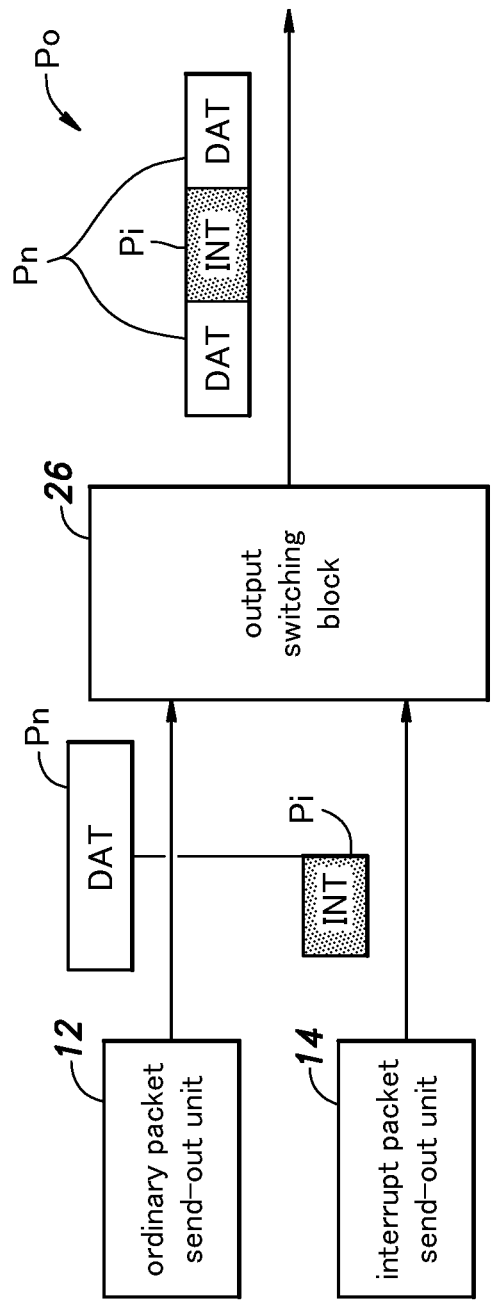
FIG. 11 is an explanatory diagram for explaining embedding of an interrupt packet performed by an output switching block shown in FIG. 4.

Namely, as shown in FIG. 11, which illustrates a relevant part of FIG. 4 in a simplified manner, when an interrupt packet Pi (interrupt input packet Pei or interrupt transmission packet Pti) is input from the interrupt packet send-out unit 14 via the interrupt packet switching block 25 (omitted in FIG. 11 but shown in FIG. 4) while an ordinary packet Pn (ordinary input packet Pen or ordinary transmission packet Ptn), which is sent from the ordinary packet send-out unit 12 via the ordinary packet switching block 24 (omitted in FIG. 11 but shown in FIG. 4), is being output as an output packet Po, the control unit of the output switching block 26 outputs an instruction to embed the interrupt packet Pi having the structure shown in FIG. 3 into the ordinary packet Pn having the structure shown in FIG. 2 at a position between the header and the trailer, namely, immediately after the header, at a position that divides the data section (ordinary data Dn) into two, or immediately after the data section (immediately before the trailer), without modifying the structure of the interrupt packet Pi. Thereby, even in a case where the ordinary data Dn contained in the ordinary packet Pn is large and the output thereof takes time, the interrupt packet Pi is output right away without waiting for the completion of the output of the ordinary packet Pn.

There are four cases in which the interrupt packet Pi is embedded in the ordinary packet Pn.

Figure 12:
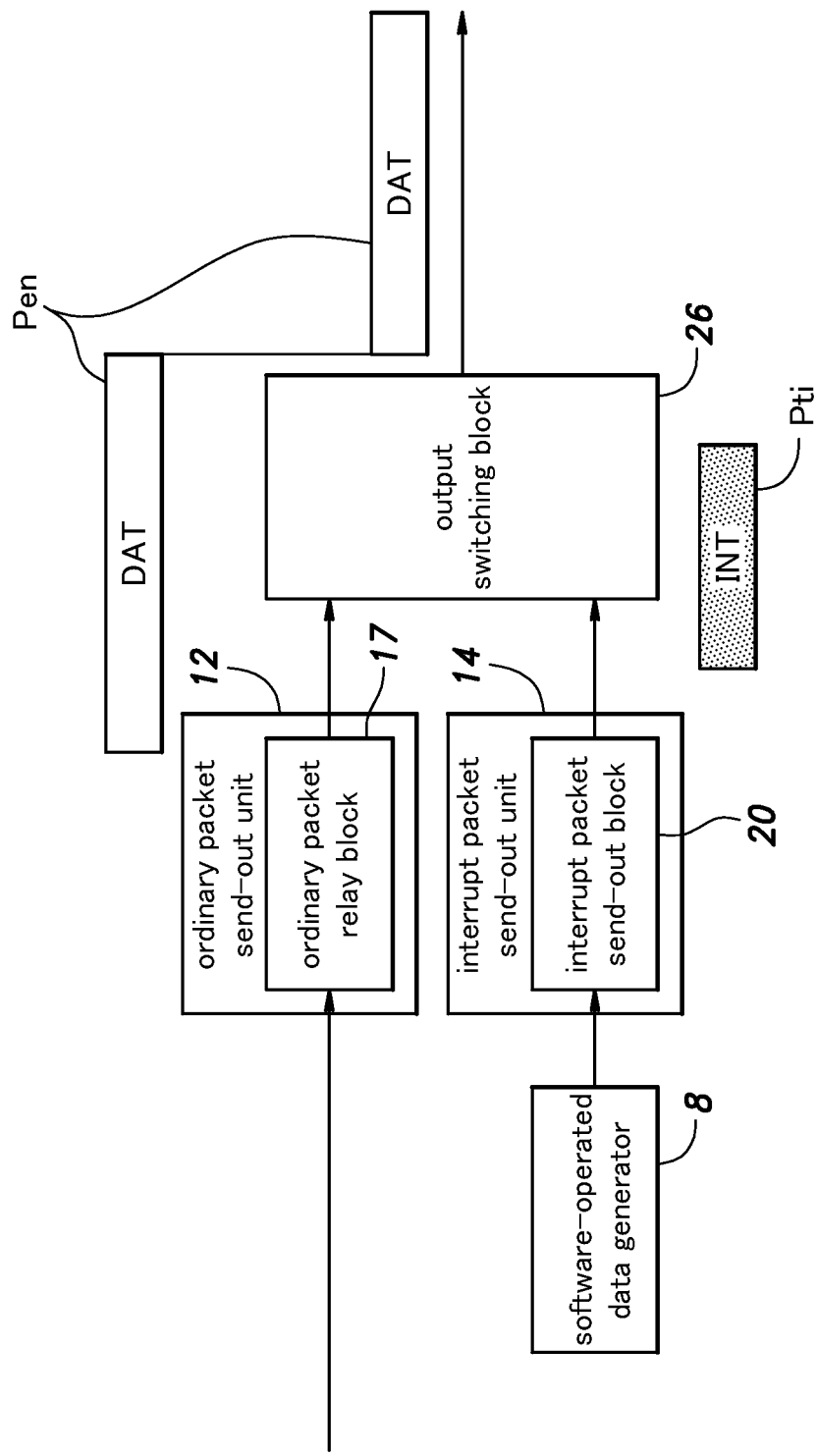
FIG. 12 is a partial block diagram showing a first case of the interrupt packet embedding.

In the first case, as illustrated in FIG. 12 showing a relevant part of FIG. 4 in a simplified manner, while the output switching block 26 is outputting an ordinary input packet Pen sent out from the ordinary packet relay block 17 of the ordinary packet send-out unit 12, an interrupt transmission packet Pti sent out from the interrupt packet send-out block 20 of the interrupt packet send-out unit 14 is input to the output switching block 26. In this case, even if the ordinary input data Den contained in the ordinary input packet Pen is large and the output thereof takes time, the interrupt transmission packet Pti is output right away. Thereby, the latency is reduced.

Figure 13:
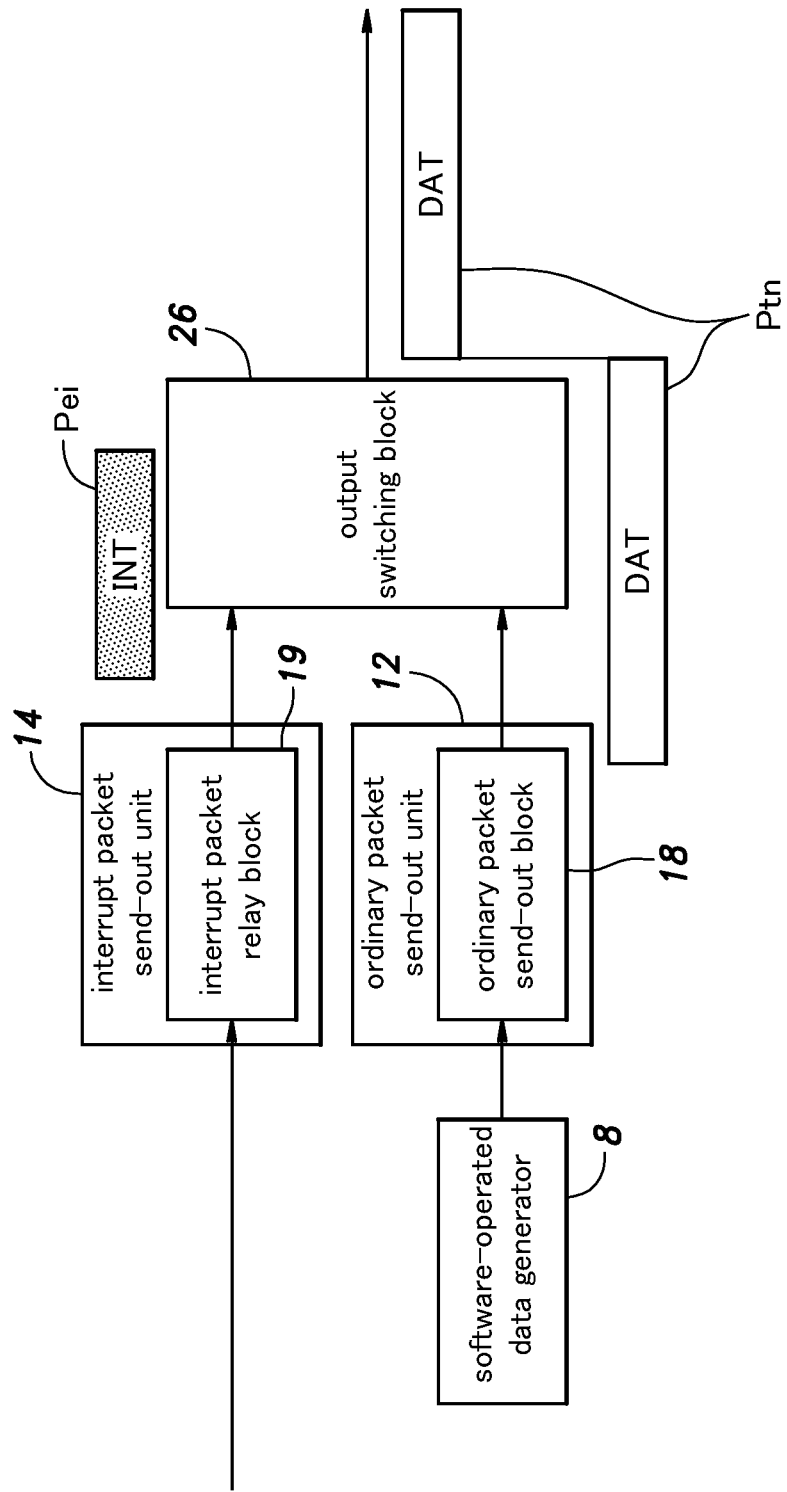
FIG. 13 is a partial block diagram showing a second case of the interrupt packet embedding.

In the second case, as illustrated in FIG. 13 showing a relevant part of FIG. 4 in a simplified manner, while the output switching block 26 is outputting an ordinary transmission packet Ptn sent out from the ordinary packet send-out block 18 of the ordinary packet send-out unit 12, an interrupt input packet Pei sent out from the interrupt packet relay block 19 of the interrupt packet send-out unit 14 is input to the output switching block 26. In this case, even if the ordinary transmission data Dtn contained in the ordinary transmission packet Ptn is large and the output thereof takes time, the interrupt input packet Pei is output right away. Thereby, the latency is reduced.

Figure 14:
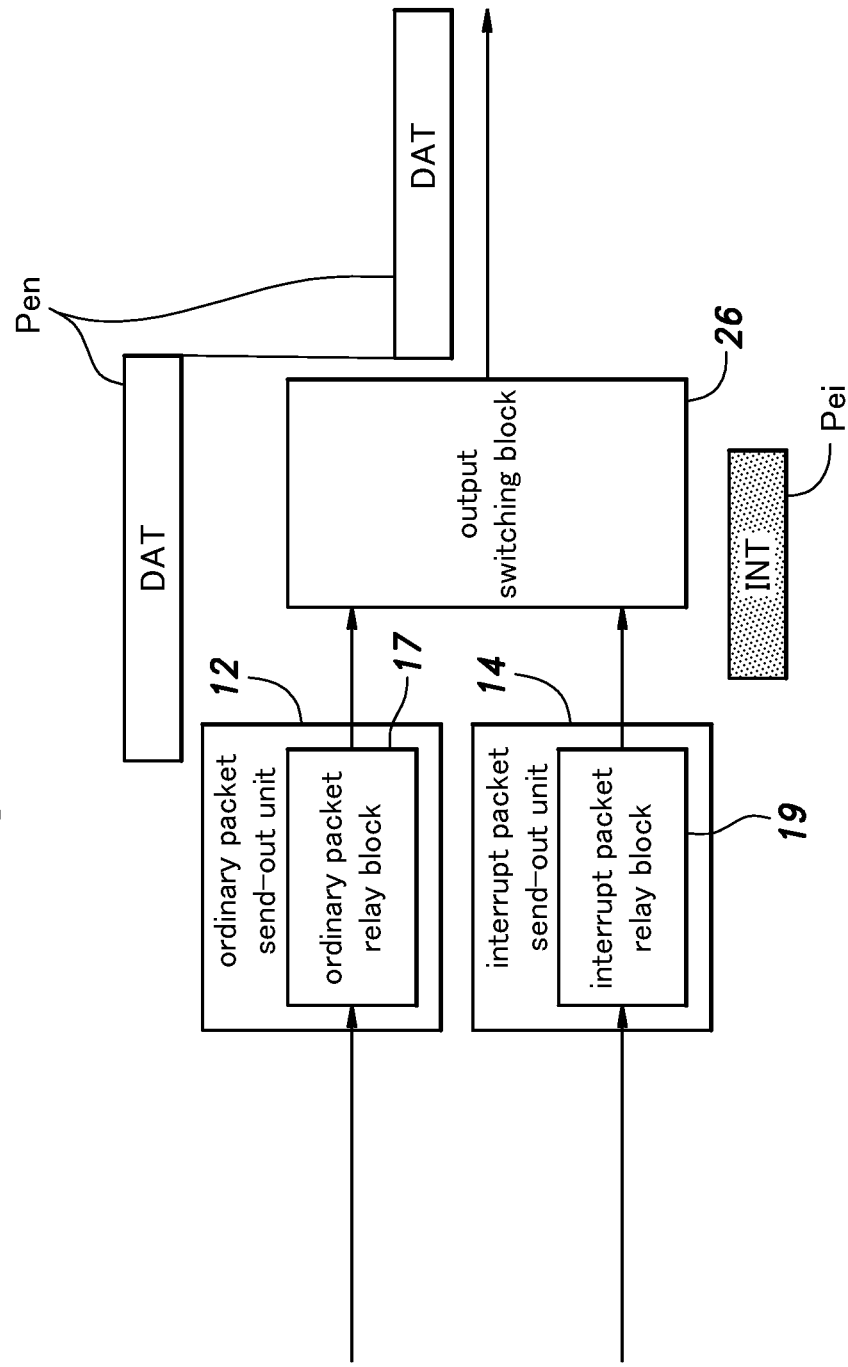
FIG. 14 is a partial block diagram showing a third case of the interrupt packet embedding.

In the third case, as illustrated in FIG. 14 showing a relevant part of FIG. 4 in a simplified manner, while the output switching block 26 is outputting an ordinary input packet Pen sent out from the ordinary packet relay block 17 of the ordinary packet send-out unit 12, an interrupt input packet Pei sent out from the interrupt packet relay block 19 of the interrupt packet send-out unit 14 is input to the output switching block 26. This case can occur though the input packets Pe (ordinary input packet Pen or interrupt input packet Pei) are input to the network controller 5 one by one sequentially in principle, because the output of an ordinary input packet Pen can be delayed for various reasons such as that the data selector 61 of the ordinary packet switching block 24 (FIG. 4, FIG. 8) may be outputting an ordinary transmission packet Ptn to the output switching block 26 when the ordinary input packet Pen is sent out from the ordinary packet relay block 17 to the ordinary packet switching block 24. In this case, the interrupt input packet Pei input to the network controller 5 subsequent to the ordinary input packet Pen and forwarded to the output switching block 26 while the ordinary input packet Pen is being output from the output switching block 26 is output right away by being embedded in the ordinary input packet Pen that is being output. Thereby, the latency is reduced.

Figure 15:
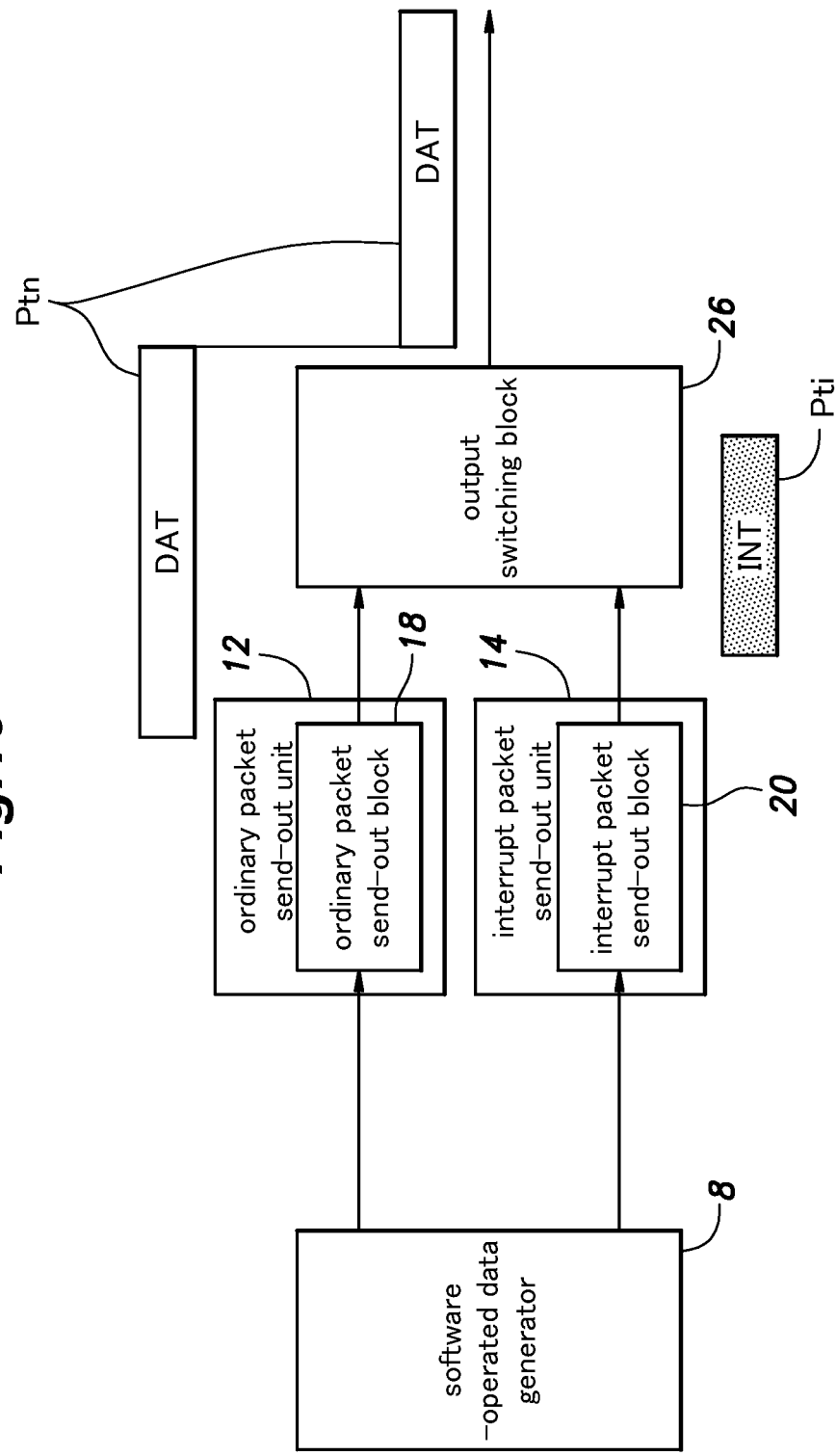
FIG. 15 is a partial block diagram showing a fourth case of the interrupt packet embedding.

In the forth case, as illustrated in FIG. 15 showing a relevant part of FIG. 4 in a simplified manner, while the output switching block 26 is outputting an ordinary transmission packet Ptn sent out from the ordinary packet send-out block 18 of the ordinary packet send-out unit 12, an interrupt transmission packet Pti sent out from the interrupt packet send-out block 20 of the interrupt packet send-out unit 14 is input to the output switching block 26. This case can occur though the transmission packets Pt are generated one by one sequentially by the software-operated data generator 8, because the output of an ordinary transmission packet Ptn can be delayed for various reasons such as that the data selector 61 of the ordinary packet switching block 24 (FIG. 4, FIG. 8) may be outputting an ordinary input packet Pen to the output switching block 26 when the ordinary transmission packet Ptn is sent out from the ordinary packet send-out block 18 to the ordinary packet switching block 24. In this case, the interrupt transmission data Dti generated by the software-operated data generator 8 subsequent to the ordinary transmission data Dtn and forwarded to the output switching block 26 as the interrupt transmission packet Pti while the ordinary transmission data Dtn (ordinary transmission packet Ptn) is being output from the output switching block 26 is output right away by being embedded in the ordinary transmission packet Ptn that is being output. Thereby, the latency is reduced.

Next, description will be made of the processing performed in a case where an exceptional output packet Po, which is formed of an ordinary packet Pn having an interrupt packet Pi embedded therein, is output from another node 2 and is input, as one exceptional input packet Pe, to the network controller 5 from an upstream side of the network 3. The interrupt packet Pi is embedded in the ordinary packet Pn without modification. Therefore, the packet distributor 11 receives, after the header containing the start of packet (SODP) of the ordinary packet Pn, a second header containing the start of packet (SOIP) of the interrupt packet Pi followed by the trailer containing the end of packet (EOIP) of the interrupt packet Pi, after which the trailer containing the end of packet (EODP) of the ordinary packet Pn is received. Thus, by detecting the headers and trailers in the input packet Pe, the packet distributor 11 can identify the start and end of the interrupt packet Pi contained in the (exceptional) input packet Pe (or embedded in the ordinary packet Pn), and can extract the interrupt packet Pi from the ordinary packet Pn.

Figure 16:
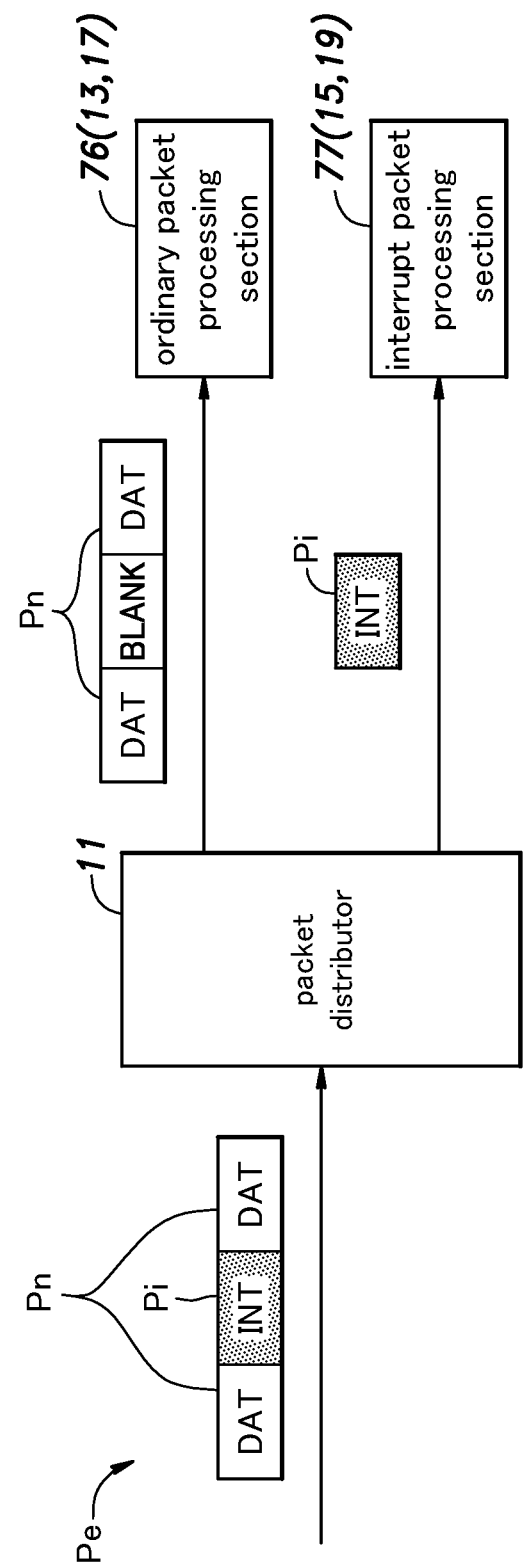
FIG. 16 is an explanatory diagram for explaining extraction of an interrupt packet performed by a packet distributor shown in FIG. 4.

As illustrated in FIG. 16 showing a relevant part of FIG. 4 in a simplified manner, upon receipt of such an exceptional input packet Pe, the packet distributor 11 extracts the interrupt packet Pi from the input packet Pe as an interrupt input packet Pei and distributes the extracted interrupt input packet Pei to an interrupt packet processing section 77 (interrupt packet accepting unit 15 and interrupt packet relay block 19 in FIG. 4). The packet distributor 11 also distributes the input packet Pe from which the interrupt input packet Pei has been extracted to an ordinary packet processing section 76 (ordinary packet accepting unit 13 and ordinary packet relay block 17 in FIG. 4) as an ordinary input packet Pen. The part of the ordinary input packet Pen from which the interrupt input packet Pei has been extracted becomes a blank part, and the ordinary packet processing section 76 that has received the ordinary input packet Pen removes the blank part and processes the ordinary input packet Pen from which the blank part has been removed as a standard ordinary input packet.

The packet distributor 11 performing the processing as described above allows the node 2 to receive an interrupt packet Pi embedded in an ordinary packet Pn from another node 2 and to properly relay or accept the interrupt packet Pi.

Figure 17:
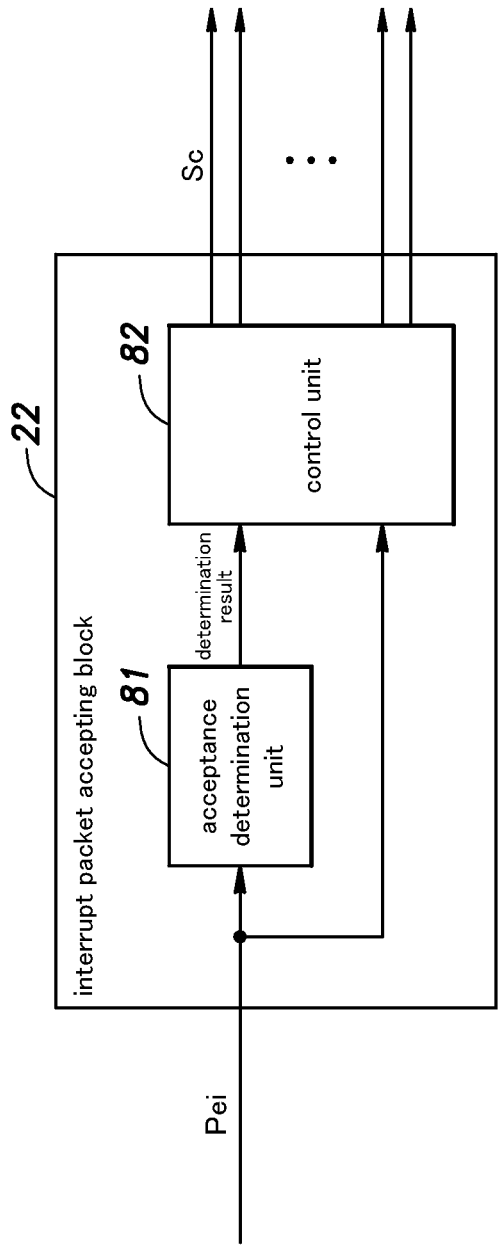
FIG. 17 is a functional block diagram of an interrupt packet accepting block shown in FIG. 4.

As shown in FIG. 17, in the interrupt packet accepting block 22 (see FIG. 4), an acceptance determination unit 81 analyzes the reception data information DIr of the interrupt input packet Pei that has been input, and executes an acceptance determination to determine whether to accept the interrupt input packet Pei on the basis of the analysis result. Specifically, the acceptance determination unit 81 determines to accept the interrupt input packet Pei when the destination node ID (DID) of the interrupt input packet Pei indicates the own node, and determines not to accept the interrupt input packet Pei when the destination node ID does not indicate the own node or when the interrupt input packet Pei is error data.

In the interrupt packet accepting block 22, when a control unit 82 is provided with a determination result from the acceptance determination unit 81 that the interrupt input packet Pei should be accepted, the control unit 82 accepts the interrupt input packet Pei input thereto, and analyzes the interrupt input packet Pei and, based on the analysis result, outputs a hardware control signal Sc toward a corresponding hardware. Namely, the hardware control signal Sc may be a control signal for controlling the hardware serving as the control target 7 of the software-operated controller 9 (FIG. 4) (e.g., motor driver for regulating the supply power provided to an electric motor for driving a joint of a robot) or for controlling other hardware associated with the node 2.

The hardware controlled by the hardware control signal Sc may be a hardware logic circuit such as an ASIC, a PLD, an ASSP, an IC (a reset IC, etc.) and so on. Preferably, the hardware consists of a custom-designed hardware logic circuit such as an ASIC and a PLD. When the hardware is an ASIC, it may be a master slice type such as a gate array, a structured ASIC, etc. or may be a custom type such as a cell-based ASIC, etc. When the hardware is a PLD, it may be a PLD in a narrow sense including a Simple PLD and a CPLD or may be a PLD in a broad sense which further includes an FPGA. Preferably, the hardware consists of a PLD.

In the following, description will be made of the kinds and contents of the hardware control signal Sc and the operation conducted in accordance therewith.

First, explanation will be made of a case where the hardware control signal Sc output from the interrupt packet accepting unit 15 is for controlling the hardware serving as the control target 7 of the software-operated controller 9.

Figure 18:
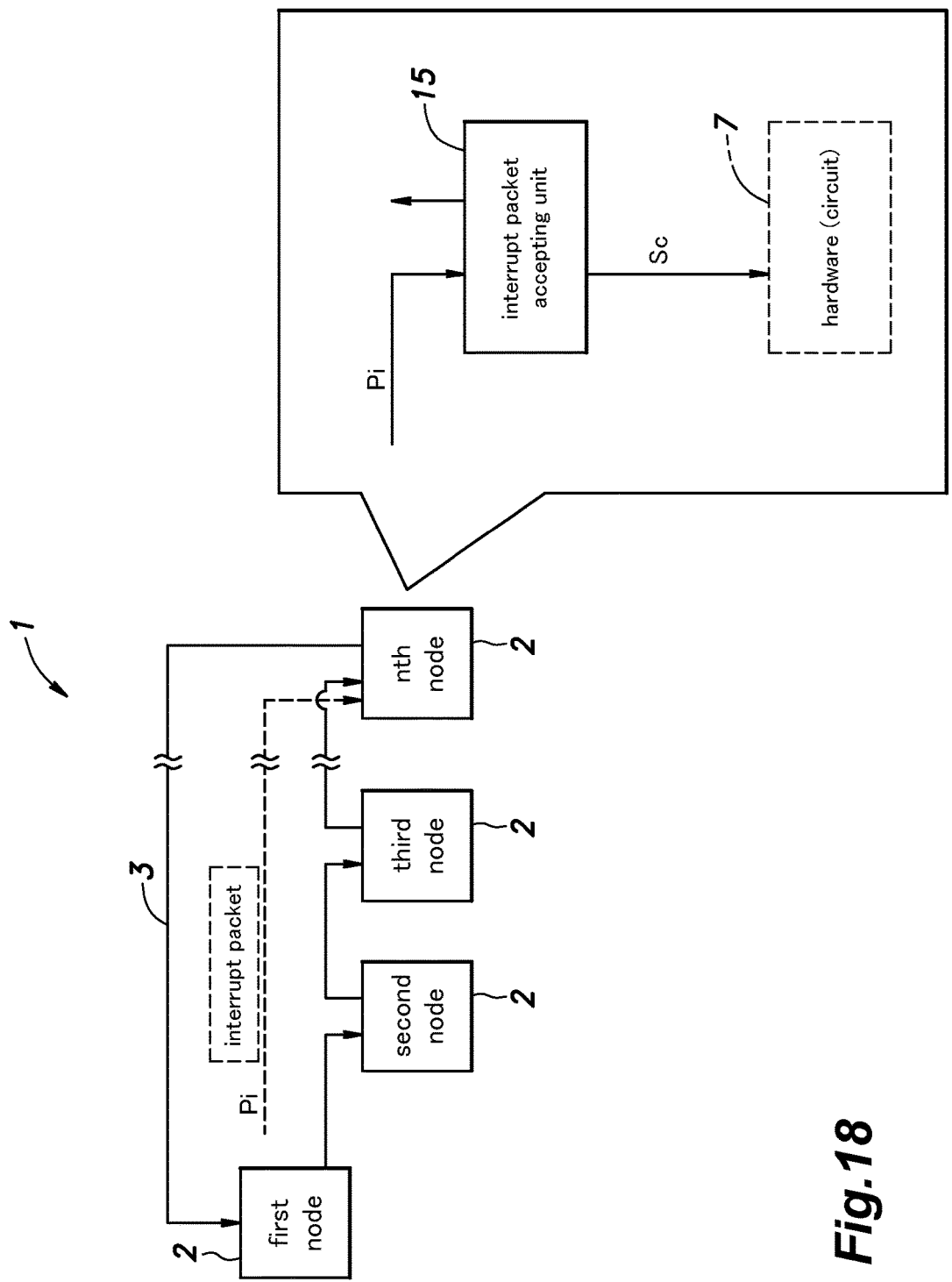
FIG. 18 is an explanatory diagram of processing initiated by an interrupt command.

As shown in FIG. 18, in this example, the communication system 1 is constituted of an n number of nodes 2 (referred to as first, second, . . . , and nth nodes in the direction of data transmission in the ring of the network 3). The first node 2 generates interrupt transmission data Dti whose destination is the nth node 2, and transmits an interrupt transmission packet Pti containing the interrupt transmission data Dti to a downstream side of the ring of the network 3 as an output packet. The interrupt packet Pi (Pti) transmitted on the network 3 is relayed through the second node 2, the third node 2 and so on until it is delivered to the nth node 2.

In the nth node 2, the interrupt packet accepting unit 15 receives (and accepts) the interrupt packet Pi (containing the interrupt transmission data Dti generated at the first node 2) as interrupt input packet Pei. Based on the interrupt data (interrupt input data Dei) contained in the interrupt input packet Pei received, a hardware control signal Sc is output to the hardware corresponding to the interrupt pin number (INT) in the interrupt input data Dei (more specifically, the control signal Sc is output to an interrupt pin of the control target 7). The hardware (such as a logic circuit) to which the hardware control signal Sc is input is controlled directly based on the hardware control signal Sc.

Figure 19:
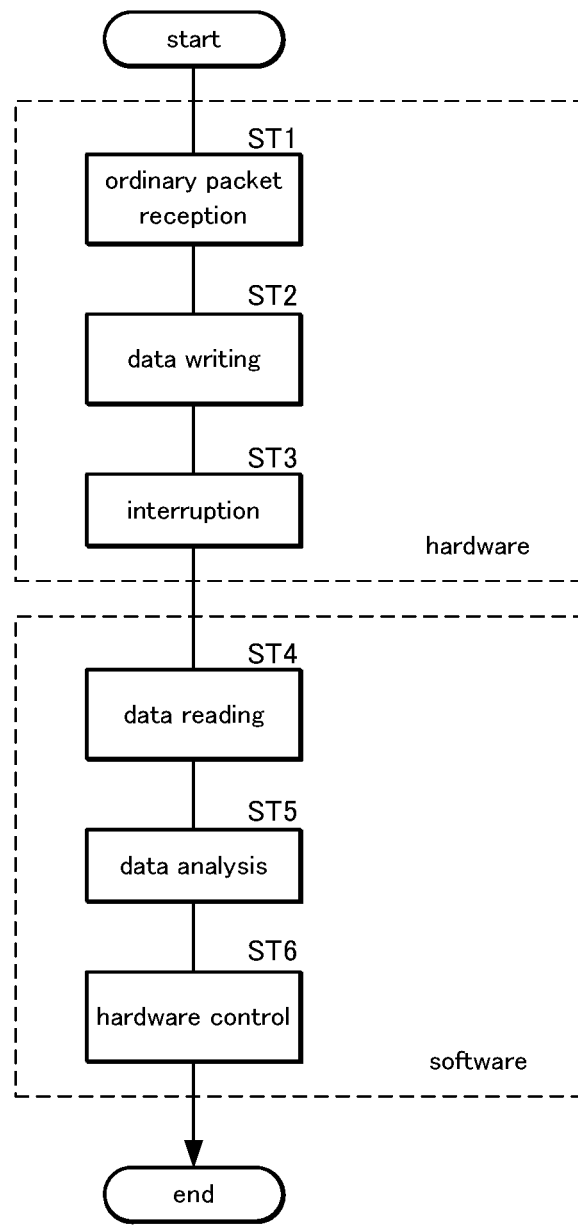
FIG. 19 is a flowchart of processing at an ordinary time.

Next, description will be made of a difference in the processing between a case where the hardware is controlled by the software-operated controller 9 and a case where the hardware is controlled directly by the hardware control signal Sc. FIG. 19 is a flowchart of processing at an ordinary time, in which the hardware is controlled by the software-operated controller 9, and FIG. 20 is a flowchart of processing at the time of interruption, in which the hardware is controlled directly by the hardware control signal Sc.

As shown in FIG. 19, at an ordinary time in which the hardware is controlled by the software-operated controller 9, the nth node 2 first receives (and accepts) a packet P as an ordinary input packet Pen at the ordinary packet accepting block 21 (FIG. 4, FIG. 7) (step ST1). Then, the nth node 2 writes the ordinary input data Den contained in the received ordinary input packet Pen in the transmission and reception buffer 16 as reception data Dr (step ST2). Thereafter, the nth node 2 performs interruption in accordance with the priority of the reception data information DIr stored in the reception data information storage buffer 50 (FIG. 7) (step ST3). The processes up to this point are executed only by the hardware implementing the network controller 5.

Subsequently, the software-operated controller 9 (FIG. 4, FIG. 7) of the nth node 2 reads out the ordinary input data Den (reception data Dr) from the transmission and reception buffer 16 (step ST4). Thereafter, the software-operated controller 9 of the nth node 2 analyzes and arithmetically processes the ordinary input data Den (step ST5). Then, the nth node 2 controls the hardware based on the analyzed and arithmetically processed data (step ST6). The processes from step ST4 to step ST6 are executed by the CPU 4 as an arithmetic processing using software.

Figure 20:
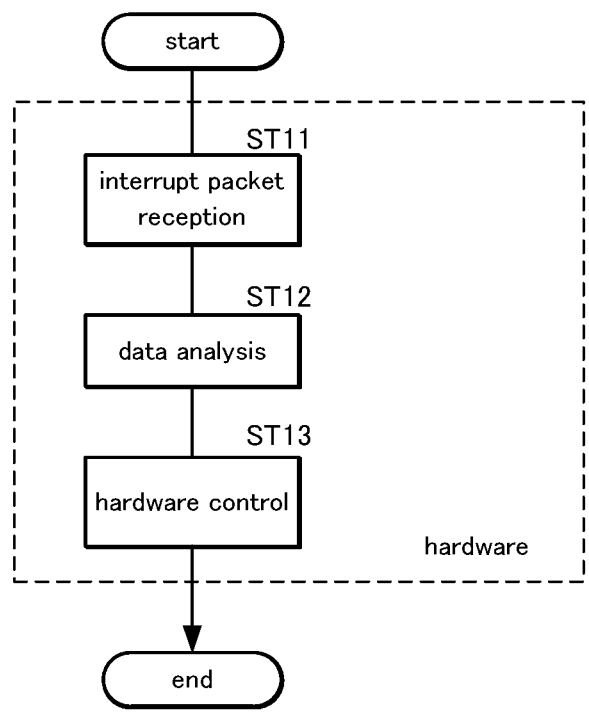
FIG. 20 is a flowchart of processing at the time of interrupt.

On the other hand, as shown in FIG. 20, in the processing at the time of interrupt, in which the hardware is controlled directly by the hardware control signal Sc, the nth node 2 first receives (and accepts) an interrupt input packet Pei at the acceptance determination unit 81 (FIG. 17) of the interrupt packet accepting block 22 (FIG. 4) (step ST11). Then, the control unit 82 (FIG. 17) of the nth node 2 analyzes the received interrupt input packet Pei (step ST12). Thereafter, based on the interrupt input data Dei (interrupt pin number (INT)) contained in the interrupt input packet Pei, the control unit 82 of the nth node 2 outputs a hardware control signal Sc to a corresponding hardware to control the hardware directly without via software. Thus, all processes in these steps ST11-ST13 are executed only by the hardware implementing the network controller 5.

As described above, since the first node 2 transmits the interrupt transmission packet Pti to the nth node 2 and the nth node 2, which receives the interrupt transmission packet Pti as an interrupt input packet Pei, controls associated hardware directly based on the received interrupt input packet Pei without via software (software-operated controller 9), the hardware can be controlled with a small latency. Further, even when the software-operated data generator 8 or the software-operated controller 9 of the nth node 2 runs out of control or the CPU 4 is hung up, it is possible to control the hardware by the interrupt packet Pi (the interrupt transmission packet Pti transmitted from the first node 2, which is received by the nth node 2 as the interrupt input packet Pei) because the control of the hardware by the interrupt packet Pi is executed without via software.

The first node 2 may generate items of interrupt transmission data Dti for a plurality of nodes 2 and transmit interrupt transmission packets Pti containing the generated items of interrupt transmission data Dti sequentially but substantially simultaneously to a downstream side of the ring of the network 3 as output packets Po. Thereby, the items of hardware of the plurality (two or more) of nodes 2 to which the interrupt transmission packets Pti are addressed are controlled by the items of interrupt transmission data Dti, whereby the operations of the items of hardware (namely, control targets 7) of these nodes 2 can be synchronized.

Next, description will be made of a case where the hardware control signal Sc output from the interrupt packet accepting unit 15 is for controlling hardware other than the control target 7 of the software-operated controller 9.

Figure 21:
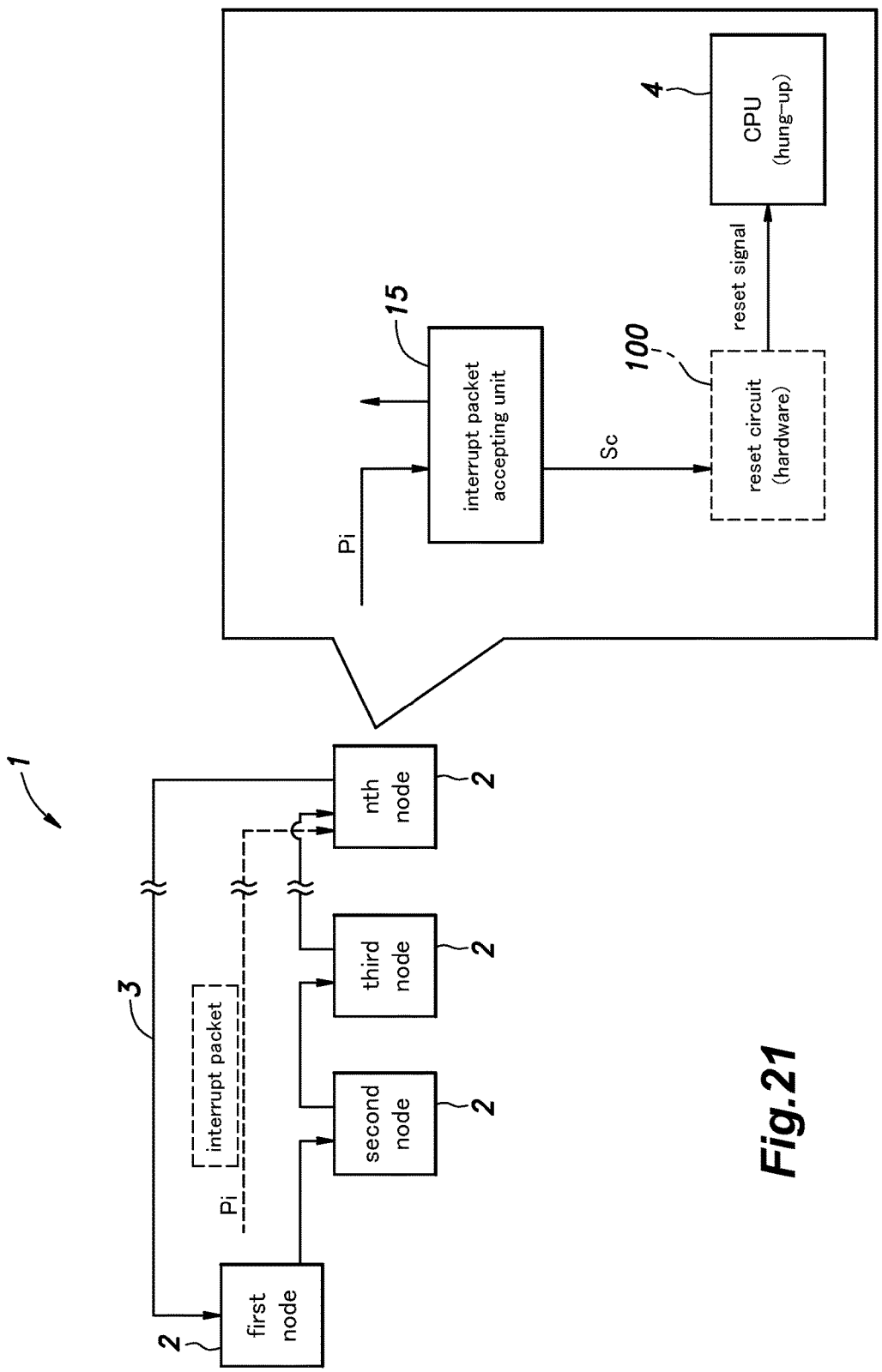
FIG. 21 is an explanatory diagram of a restart process executed in response to an interrupt.

As shown in FIG. 21, in this example, the first node 2 generates an interrupt transmission packet Pti and transmits it as an output packet to the nth node 2 in a "hung up" state to control hardware (reset circuit) 100 for resetting the CPU 4 in the nth node 2.

In the nth node 2, the interrupt packet accepting unit 15 receives (and accepts) the interrupt packet Pi (Pti) transmitted on the network 3 as interrupt input packet Pei. Based on the interrupt input packet Pei received, a hardware control signal Sc is output to an interrupt pin of the reset circuit (hardware) 100 corresponding to the interrupt pin number (INT) in the interrupt input data Dei. The reset circuit 100 to which the hardware control signal Sc is input is controlled directly based on the hardware control signal Sc, and outputs a reset signal to the hung-up CPU 4 (namely, restarts (reboots) the software).

Thus, by transmitting the interrupt packet Pi for controlling the hardware (reset circuit) from the first node 2 to the nth node 2 separately from that for directly controlling the control target 7 of the software-operated controller 9 as described above, it is possible to reset the hung-up CPU 4 of the nth node 2. This makes it possible to bring the software-operated data generator 8 or the software-operated controller 9 of the nth node 2 back to a normal state.

On the other hand, there may be a case where the CPU 4 is not restarted normally even when the hardware control signal Sc for the reset circuit 100 is transmitted and the reset signal is output to the CPU 4, and in such a case, the software-operated data generator 8 may continue to be out of control and send out an unnecessary packet P which may contain data D with a large data size if there is no limit to the size of the packet P. Conventionally, if such a case occurs when the network 3 is a ring network as in the present embodiment, the interrupt packet Pi becomes unable to be relayed (transmitted) until the transmission of the unnecessary packet P is completed. In the present embodiment, the interrupt packet Pi is output by being embedded in the ordinary packet Pn, and thus, even when there is a runaway node 2 (namely, a node 2 whose software-operated data generator 8 is running out of control) in the ring network 3, the interrupt packet Pi can be relayed right away.

In the foregoing, the present invention has been described in terms of the concrete embodiments thereof, but the present invention is not limited to the foregoing embodiments and various alterations and modifications may be made. For instance, though in the above embodiment, the interrupt packet was transmitted from one node 2 to another node 2 to control the hardware of the other node 2 without via the software-operated controller 9 of the other node 2, the interrupt packet may be used for other purposes, and any packet that should be transmitted from one node 2 to another node 2 to cause highly urgent action to be taken at the other node may be transmitted as an interrupt packet embedded in an ordinary packet. Besides, the concrete structure, arrangement, number, etc. of the component parts of the embodiments as well as the processing procedures may be appropriately changed within the scope of the sprit of the present invention. Also, not all of the structural elements shown in the above embodiments are necessarily indispensable and they may be selectively used as appropriate.

The invention claimed is:

1. A communication system having a plurality of nodes communicably connected via a ring network,
wherein each of at least two of the nodes comprises:
a central processing unit (CPU) comprising:
a software-operated data generator that executes arithmetic processing using software to generate ordinary transmission data and interrupt transmission data to be transmitted to another node; and
a software-operated controller that executes arithmetic processing using software to control hardware serving as a control target; and
a network controller separate from the CPU and implemented by hardware, the network controller comprising:
an ordinary packet send-out block that generates and sends out an ordinary transmission packet containing the ordinary transmission data generated by the software-operated data generator and having a header and a trailer;
an interrupt packet send-out block that generates and sends out an interrupt transmission packet containing the interrupt transmission data generated by the software-operated data generator and having a header and a trailer;
a packet distributor that receives an ordinary packet and an interrupt packet transmitted from another node as an ordinary input packet and an interrupt input packet, respectively, and distributes the received ordinary input packet and interrupt input packet, the ordinary packet containing ordinary data and having a header and a trailer and the interrupt packet containing interrupt data and having a header and a trailer;
an ordinary packet relay block that sends out the ordinary input packet distributed from the packet distributor when a destination of the ordinary input packet is not the own node, to relay the ordinary input packet;
an interrupt packet relay block that sends out the interrupt input packet distributed from the packet distributor when a destination of the interrupt input packet is not the own node, to relay the interrupt input packet;
an output switching unit that receives the interrupt transmission packet, the interrupt input packet, the ordinary transmission packet, and the ordinary input packet, and outputs the received interrupt transmission packet, interrupt input packet, ordinary transmission packet, and ordinary input packet as output packets in such a manner that the interrupt transmission packet and the interrupt input packet are output more preferentially than the ordinary transmission packet and the ordinary input packet;
an ordinary packet accepting block that accepts the ordinary input packet distributed from the packet distributor when the destination of the ordinary input packet is the own node; and
an interrupt packet accepting block that accepts the interrupt input packet distributed from the packet distributor when the destination of the interrupt input packet is the own node and, based on the interrupt data contained in the accepted interrupt input packet, outputs a hardware control signal to the hardware serving as the control target or other hardware associated with the own node such that the hardware serving as the control target or the other hardware is directly controlled based on the hardware control signal without via the software-operated controller,
wherein the software-operated controller executes arithmetic processing based on the ordinary data contained in the ordinary input packet accepted by the ordinary packet accepting block,
wherein when the output switching unit receives an interrupt packet, which is the interrupt transmission packet or the interrupt input packet, while the output switching unit is outputting an ordinary packet, which is the ordinary transmission packet or the ordinary input packet, the output switching unit outputs the received interrupt packet by embedding the received interrupt packet into the ordinary packet that is being output at a position between the header and the trailer of the ordinary packet,
and wherein when the ordinary input packet transmitted from the other node contains an interrupt packet embedded therein, the packet distributor extracts the interrupt packet and distributes the extracted interrupt packet as an interrupt input packet.

2. The communication system according to claim 1, wherein when the output switching unit receives the interrupt transmission packet sent out from the interrupt packet send-out block while the output switching unit is outputting the ordinary input packet received from the ordinary packet relay unit, the output switching unit outputs the received interrupt transmission packet by embedding the same into the ordinary input packet that is being output at a position between the header and the trailer of the ordinary input packet.

3. The communication system according to claim 1, wherein when the output switching unit receives the interrupt input packet from the interrupt packet relay unit while the output switching unit is outputting the ordinary transmission packet received from the ordinary packet send-out block, the output switching unit outputs the received interrupt input packet by embedding the same into the ordinary transmission packet that is being output at a position between the header and the trailer of the ordinary transmission packet.

4. The communication system according to claim 1, wherein when the output switching unit receives the interrupt input packet from the interrupt packet relay block while the output switching unit is outputting the ordinary input packet received from the ordinary packet relay block, the output switching unit outputs the received interrupt input packet by embedding the same into the ordinary input packet that is being output at a position between the header and the trailer of the ordinary input packet.

5. The communication system according to claim 1, wherein when the output switching unit receives the interrupt transmission packet from the interrupt packet send-out block while the output switching unit is outputting the ordinary transmission packet received from the ordinary packet send-out block, the output switching unit outputs the received interrupt transmission packet by embedding the same into the ordinary transmission packet that is being output at a position between the header and the trailer of the ordinary transmission packet.

* * * * *